US011018933B2

(12) United States Patent
Desai et al.

(10) Patent No.: US 11,018,933 B2
(45) Date of Patent: May 25, 2021

(54) CONTEXT AWARE BASED ADJUSTMENT IN VISUAL RENDERING OF NETWORK SITES

(71) Applicant: Cisco Technology, Inc., San Jose, CA (US)

(72) Inventors: Vishal Satyendra Desai, San Jose, CA (US); Benjamin Jacob Cizdziel, San Jose, CA (US); Santosh Babaji Kulkarni, San Jose, CA (US); Young II Choi, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/547,465

(22) Filed: Aug. 21, 2019

(65) Prior Publication Data

US 2020/0162325 A1    May 21, 2020

Related U.S. Application Data

(60) Provisional application No. 62/769,656, filed on Nov. 20, 2018.

(51) Int. Cl.
*H04L 12/24* (2006.01)

(52) U.S. Cl.
CPC ...... *H04L 41/0816* (2013.01); *H04L 41/0893* (2013.01); *H04L 41/12* (2013.01); *H04L 41/22* (2013.01)

(58) Field of Classification Search
CPC ....... H04L 63/20; H04L 63/102; H04L 63/10; H04L 63/083; H04L 41/0816; H04L 41/0893; H04L 41/12; H04L 41/22; G06F 9/45558; G06F 2009/45595; G06F 21/604; G06F 21/31; G06F 21/316; G06F 21/45; G06F 21/46; G06Q 30/02
See application file for complete search history.

(56) References Cited

U.S. PATENT DOCUMENTS

| 5,815,665 | A  | * | 9/1998  | Teper    | ............. | G06Q 20/00 |
|           |    |   |         |          |               | 705/26.35  |
| 6,687,832 | B1 | * | 2/2004  | Harada   | ............. | H04L 41/12 |
|           |    |   |         |          |               | 726/22     |
| 7,460,020 | B2 | * | 12/2008 | Reyes    | ............. | G08B 7/06  |
|           |    |   |         |          |               | 340/506    |
| 8,103,445 | B2 |   | 1/2012  | Smith et al. | | |
| 8,504,945 | B2 |   | 8/2013  | Jakobson et al. | | |

(Continued)

*Primary Examiner* — Ninos Donabed
(74) *Attorney, Agent, or Firm* — Polsinelli PC

(57) ABSTRACT

The present disclosure is directed to systems and methods that enable adjusting of focal point of maps displaying network sites of an enterprise network for access by an authorized network controller, based on network provider's access privilege. In one aspect a method includes receiving an access request to access a network controller management dashboard for managing network sites of a network; determining an access privilege associated with the access request; identifying one or more network sites for the access request based on the access privilege; and providing an interactive visual rendering of the one or more network sites by adjusting a focal point of a map of the network sites to display only the one or more network sites.

20 Claims, 15 Drawing Sheets

(56) References Cited

U.S. PATENT DOCUMENTS

| | | | |
|---|---|---|---|
| 8,779,921 B1 * | 7/2014 | Curtiss | G08B 25/009 340/541 |
| 8,868,736 B2 | 10/2014 | Bowler et al. | |
| 9,069,774 B1 * | 6/2015 | Ansari | G06F 11/3006 |
| 9,563,850 B2 | 2/2017 | van Zwol et al. | |
| 2007/0208840 A1 * | 9/2007 | McConville | H04L 41/22 709/223 |
| 2008/0048851 A1 * | 2/2008 | Reyes | G08B 25/016 340/506 |
| 2009/0287837 A1 * | 11/2009 | Felsher | G16H 10/60 709/229 |
| 2010/0212002 A1 * | 8/2010 | Michener | G06Q 40/02 726/7 |
| 2010/0235285 A1 * | 9/2010 | Hoffberg | G06Q 20/401 705/75 |
| 2013/0073387 A1 * | 3/2013 | Heath | G06Q 30/02 705/14.53 |
| 2013/0073389 A1 * | 3/2013 | Heath | G06Q 50/01 705/14.54 |
| 2013/0073400 A1 * | 3/2013 | Heath | G06F 16/29 705/14.73 |
| 2013/0132850 A1 * | 5/2013 | Subramanian | H04L 41/12 715/735 |
| 2013/0159021 A1 * | 6/2013 | Felsher | G06F 21/6245 705/3 |
| 2014/0172513 A1 * | 6/2014 | MacLean | G06Q 50/26 705/7.39 |
| 2014/0369212 A1 * | 12/2014 | Raravi | H04W 40/246 370/252 |
| 2014/0370820 A1 * | 12/2014 | Pulini | H04W 24/08 455/67.7 |
| 2014/0380177 A1 * | 12/2014 | Gutermuth | G06F 3/0482 715/736 |
| 2015/0052106 A1 | 2/2015 | Barros | |
| 2015/0074259 A1 * | 3/2015 | Ansari | H04L 67/02 709/224 |
| 2015/0161224 A1 * | 6/2015 | LaRowe | G06F 16/26 707/776 |
| 2016/0191532 A1 * | 6/2016 | Seiver | H04L 63/101 726/4 |
| 2017/0078322 A1 * | 3/2017 | Seiver | H04L 63/1433 |
| 2017/0344703 A1 * | 11/2017 | Ansari | H04M 15/73 |
| 2017/0353243 A1 * | 12/2017 | Brueckheimer | H04B 10/0793 |

* cited by examiner

CONTEXT AWARE BASED ADJUSTMENT IN VISUAL RENDERING OF NETWORK SITES

RELATED APPLICATIONS DATA

This application claims priority to U.S. Provisional Application No. 62/769,656 filed on Nov. 20, 2018, the entire content of which is incorporated herein by reference.

TECHNICAL FIELD

The subject matter of this disclosure relates in general to the field of computer networking, and more particularly, to systems and methods for automatic provisioning of network components.

BACKGROUND

A campus network can provide connectivity to computing devices (e.g., servers, workstations, desktop computers, laptop computers, tablets, mobile phones, etc.) and things (e.g., desk phones, security cameras, lighting, heating, ventilating, and air-conditioning (HVAC), windows, doors, locks, medical devices, industrial and manufacturing equipment, etc.) within environments such as offices, hospitals, colleges and universities, oil and gas facilities, factories, and similar locations. Some of the unique challenges a campus network may face include integrating wired and wireless devices, on-boarding computing devices and things that can appear anywhere in the network and maintaining connectivity when the devices and things migrate from location to location within the network, supporting bring your own device (BYOD) capabilities, connecting and powering Internet-of-Things (IoT) devices, and securing the network despite the vulnerabilities associated with Wi-Fi access, device mobility, BYOD, and IoT.

Deployment and management of a network capable of providing these functions often require constant and extensive configuration and administration by network operators. Dynamic network access controllers utilized available to network operators, typically include a dashboard through which a network operator can access various network sites, view site analytics, perform connectivity troubleshooting, etc. Due to geographical disbursement of various network sites around the globe, such dashboards may provide the same access (overview) to network sites to any given network operator regardless of the given network operator's access privilege, which results in any given network operator to have to parse through more information than necessary to access network site(s) of interest.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
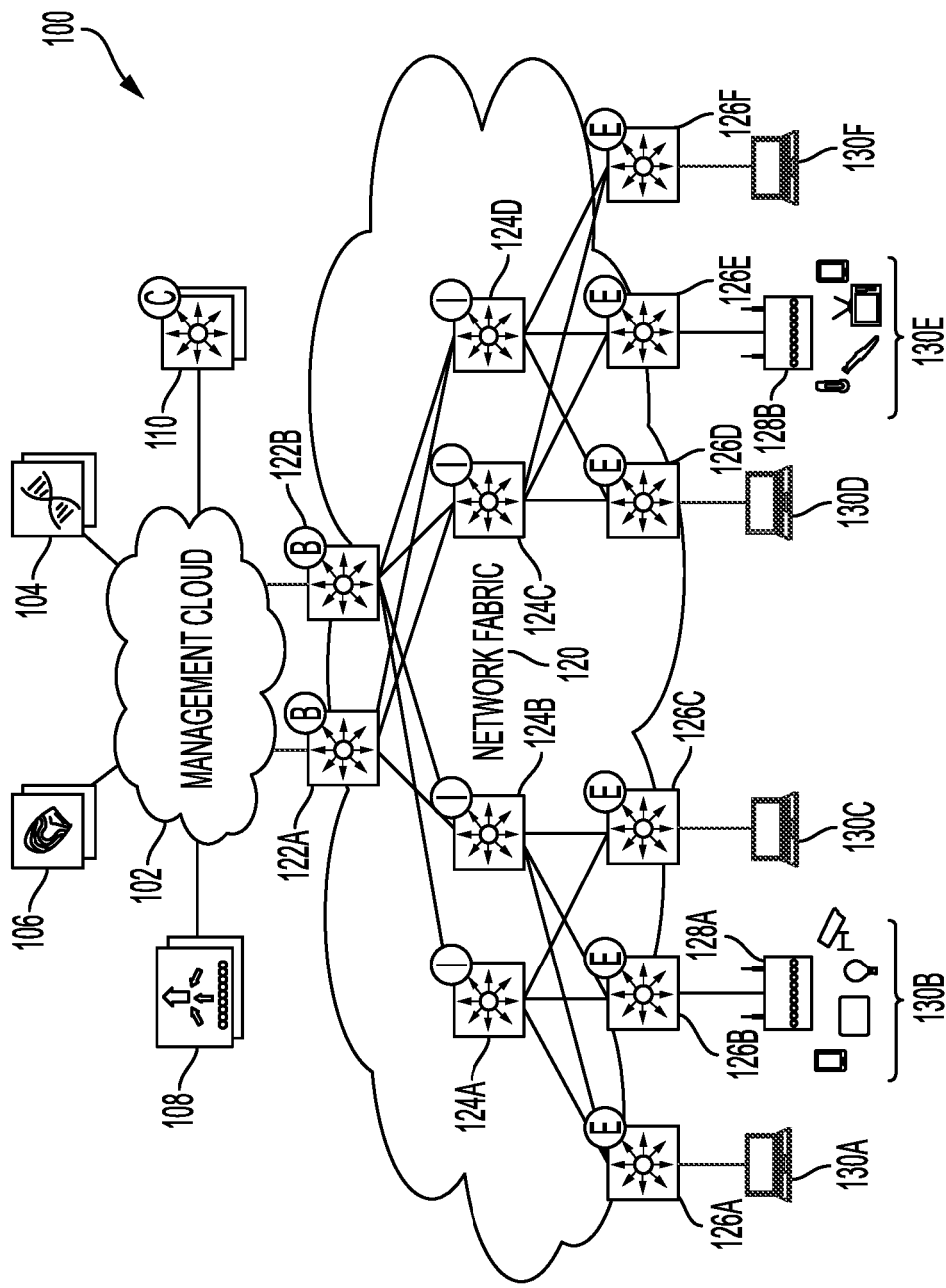
FIG. 1 illustrates an example of a physical topology of an enterprise network in accordance with an embodiment.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

An enterprise network may have multiple authorized operators with varying levels of access privilege to access, through a dashboard of a network access controller, information about various network sites (sites) within such network. For example, a chief technology officer of a multi-national corporation having a deployed enterprise network comprising of hundreds of network sites around the globe, can have complete access to monitor and manage all sites within the network while a local network operator in California may have access privilege to monitor and manage only a subset of network sites of the corporation located in California. Such local operator in California may be prohibited from accessing sites in Europe, Asia, etc.

However, regardless of level of access privilege, any given network operator, when accessing a dashboard of a network controller, observes a global map of all network sites. For example, the same global map of site locations is displayed on a dashboard accessed by the local California network operator and a dashboard accessed by the chief technology officer, even though they have different levels of access privilege. When large number of network sites exist, it may be difficult and cumbersome to comb through all sites (e.g., on a global map) to find one or more site of interest. This inefficiency is made more apparent when a particular logged in operator does not necessarily have the access privilege to access all network sites shown on a map but instead has the privilege of access to only a subset of such sites, as described above with reference to the example of the chief technology officer and the local California network operator. Therefore, it is not necessary for such local network operator to have a visual view of network sites not accessible by that operator.

The present disclosure provides example embodiments, according to which, a view of network sites for any given network operator, is adjusted based on the network operator's access privilege and/or other filtering criteria, which will be described below. In other words, based on access privilege and other context factors, a network controller can automatically adjust a focal point of a map of network sites to show only those network sites to which a given network operator has permission to access, manage, etc.

In one aspect, a method includes receiving an access request to access a network controller management dashboard for managing network sites of a network; determining an access privilege associated with the access request; identifying one or more network sites for the access request based on the access privilege; and providing an interactive visual rendering of the one or more network sites by adjusting a focal point of a map of the network sites to display only the one or more network sites.

In one aspect, a controller includes memory having computer-readable instructions stored therein and one or more processors. The one or more processors are configured to execute the computer-readable instructions to receive an access request to access a network controller management dashboard for managing network sites of a network; determine an access privilege associated with the access request; identify one or more network sites for the access request based on the access privilege; and provide an interactive visual rendering of the one or more network sites by adjusting a focal point of a map of the network sites to display only the one or more network sites.

In one aspect, one or more non-transitory computer-readable media include computer-readable instructions, which when executed by one or more processors, cause the one or more processors to receive an access request to access a network controller management dashboard for managing network sites of a network; determine an access privilege associated with the access request; identify one or more network sites for the access request based on the access privilege; and provide an interactive visual rendering of the one or more network sites by adjusting a focal point of a map of the network sites to display only the one or more network sites.

DETAILED DESCRIPTION

As noted above, the present disclosure provides example embodiments, according to which, a view of network sites (a focal point of a map displaying network sites) for any given network operator, is adjusted based on the network operator's access privilege and/or other filtering criteria, which will be described below.

The disclosure begins with an overview of examples of enterprise networks and components thereof, with reference to FIGS. 1, 2 and 3A-I.

The concepts of the present disclosure may be implemented in a controlled network of access points in a campus network that provide network connectivity to client devices connected thereto. Such network of access points may be managed by a network controller (e.g., a Dynamic Network Access Controller (DNAC), a Wireless Local Area Network Controller (WLC), etc., examples of which will be described below.

Intent-based networking is an approach for overcoming the deficiencies of conventional enterprise networks. The motivation of intent-based networking is to enable a user to describe in plain language what he or she wants to accomplish (e.g., the user's intent) and have the network translate the user's objective into configuration and policy changes that are automatically propagated across a complex and heterogeneous computing environment. Thus, an intent-based network can abstract network complexity, automate much of the work of provisioning and managing the network typically handled by a network administrator, and assure secure operation and optimal performance of the network. As an intent-based network becomes aware of the users, devices, and things making connections in the network, it can automatically apply security permissions and service levels in accordance with the privileges and quality of experience (QoE) assigned to the users, devices, and things. Table 1 sets forth examples of intents and workflows that can be automated by an intent-based network to achieve a desired outcome.

TABLE 1

Examples of Intents and Associated Workflows

| Intent | Workflow |
| --- | --- |
| I need to scale out my application database | Extend network segments; update load balancer configuration; configure quality of service (QoS) |
| I have scheduled a telemedicine session at 10 am | Create high-definition (HD) video connection; prioritize with end-to-end QoS; validate performance; keep the communication safe; tear down connection after call |

TABLE 1-continued

Examples of Intents and Associated Workflows

| Intent | Workflow |
|---|---|
| I am rolling out a new IoT app for factory equipment monitoring | Create a new segment for all factory devices to connect to the IoT app; isolate from other traffic; apply service level agreement (SLA); validate SLA; optimize traffic flow |
| I need to deploy a secure multi-tier application | Provision multiple networks and subnets; configure access control lists (ACLs) and firewall rules; advertise routing information |

Some additional examples of use cases of an intent-based network:

An intent-based network can learn the performance needs of applications and services and adapt the network from end-to-end to achieve specified service levels;

Instead of sending technicians to every office, floor, building, or branch, an intent-based network can discover and identify devices and things as they connect, assign security and micro-segmentation profiles according to established policies, and continuously monitor access point performance to automatically adjust for QoE;

Users can move freely among network segments, mobile device in hand, and automatically connect with the correct security and access privileges;

Switches, routers, and other network devices can be powered up by local non-technical office personnel, and the network devices can be configured remotely (by a user or by the network) via a cloud management console with the appropriate policies as defined by the intents for the specific location (e.g., permanent employee access, visiting employee access, guest access, etc.); and Machine learning and artificial intelligence agents running in the network can continuously monitor and analyze network traffic and connections, compare activity against pre-defined intents such as application performance or security policies, detect malware intrusions in encrypted traffic and automatically isolate infected devices, and provide a historical record of network events for analysis and troubleshooting.

FIG. 1 illustrates an example of a physical topology of an enterprise network 100 for providing intent-based networking. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-Ready™ devices can operate as the fabric nodes 122, 124, and 126.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

Figure 2:
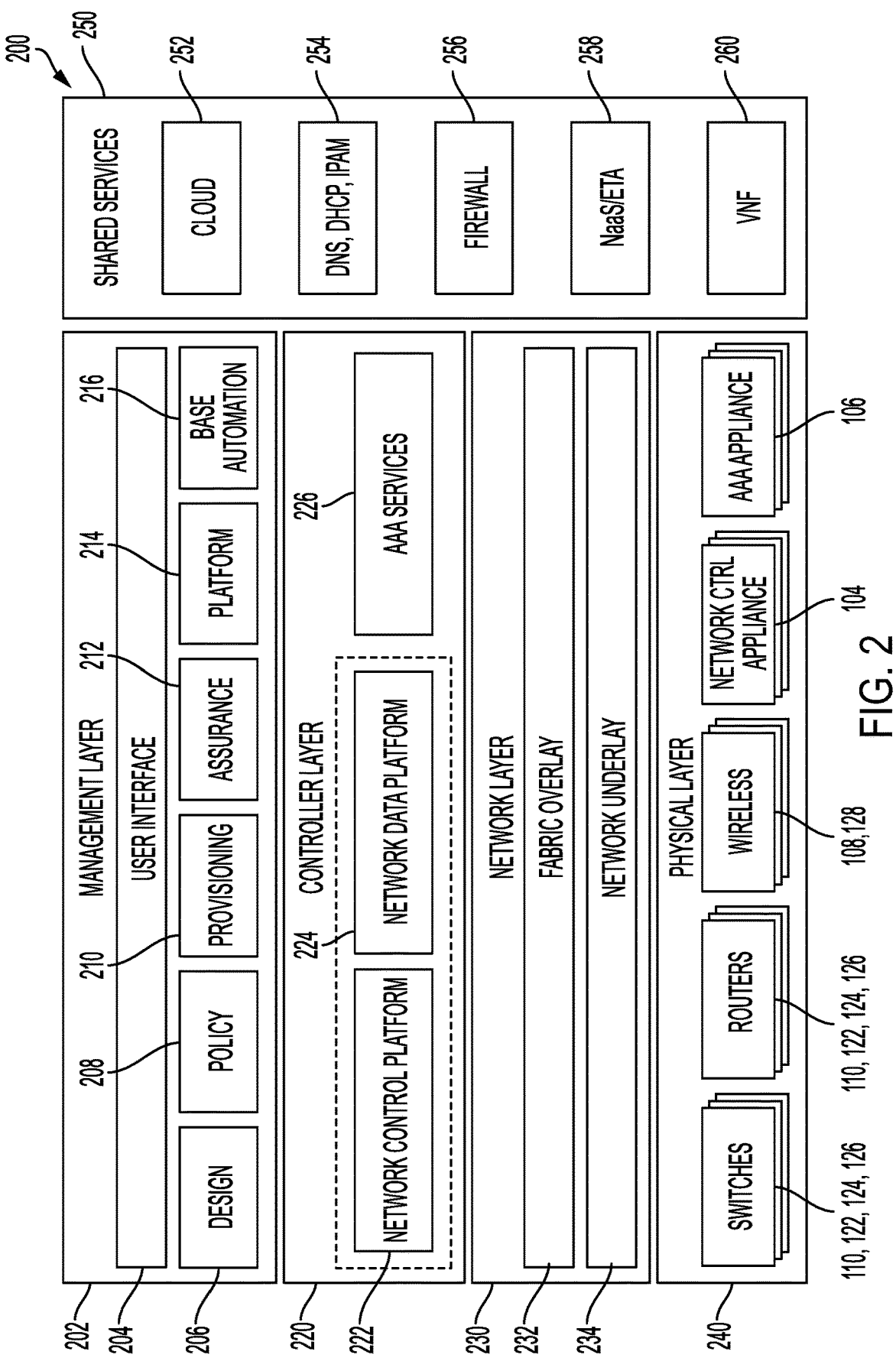
FIG. 2 illustrates an example of a logical architecture for an enterprise network in accordance with an embodiment.

FIG. 2 illustrates an example of a logical architecture 200 for an enterprise network (e.g., the enterprise network 100). One of ordinary skill in the art will understand that, for the logical architecture 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 200 includes a management layer 202, a controller layer 220, a network layer 230 (such as embodied by the network fabric 120), a physical layer 240 (such as embodied by the various elements of FIG. 1), and a shared services layer 250.

The management layer 202 can abstract the complexities and dependencies of other layers and provide a user with tools and workflows to manage an enterprise network (e.g., the enterprise network 100). The management layer 202 can include a user interface 204, design functions 206, policy functions 208, provisioning functions 210, assurance functions 212, platform functions 214, and base automation functions 216. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some embodiments, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 214 can support the top-level functions by allowing users to perform certain network-wide tasks.

FIGS. 3A-3I illustrate examples of graphical user interfaces for implementing the user interface 204. Although FIGS. 3A-3I show the graphical user interfaces as comprising webpages displayed in a browser executing on a large form-factor general purpose computing device (e.g., server, workstation, desktop, laptop, etc.), the principles disclosed in the present disclosure are widely applicable to client devices of other form factors, including tablet computers, smart phones, wearable devices, or other small form-factor general purpose computing devices; televisions; set top boxes; IoT devices; and other electronic devices capable of connecting to a network and including input/output components to enable a user to interact with a network management system. One of ordinary skill will also understand that the graphical user interfaces of FIGS. 3A-3I are but one example of a user interface for managing a network. Other embodiments may include a fewer number or a greater number of elements.

Figure 3A:
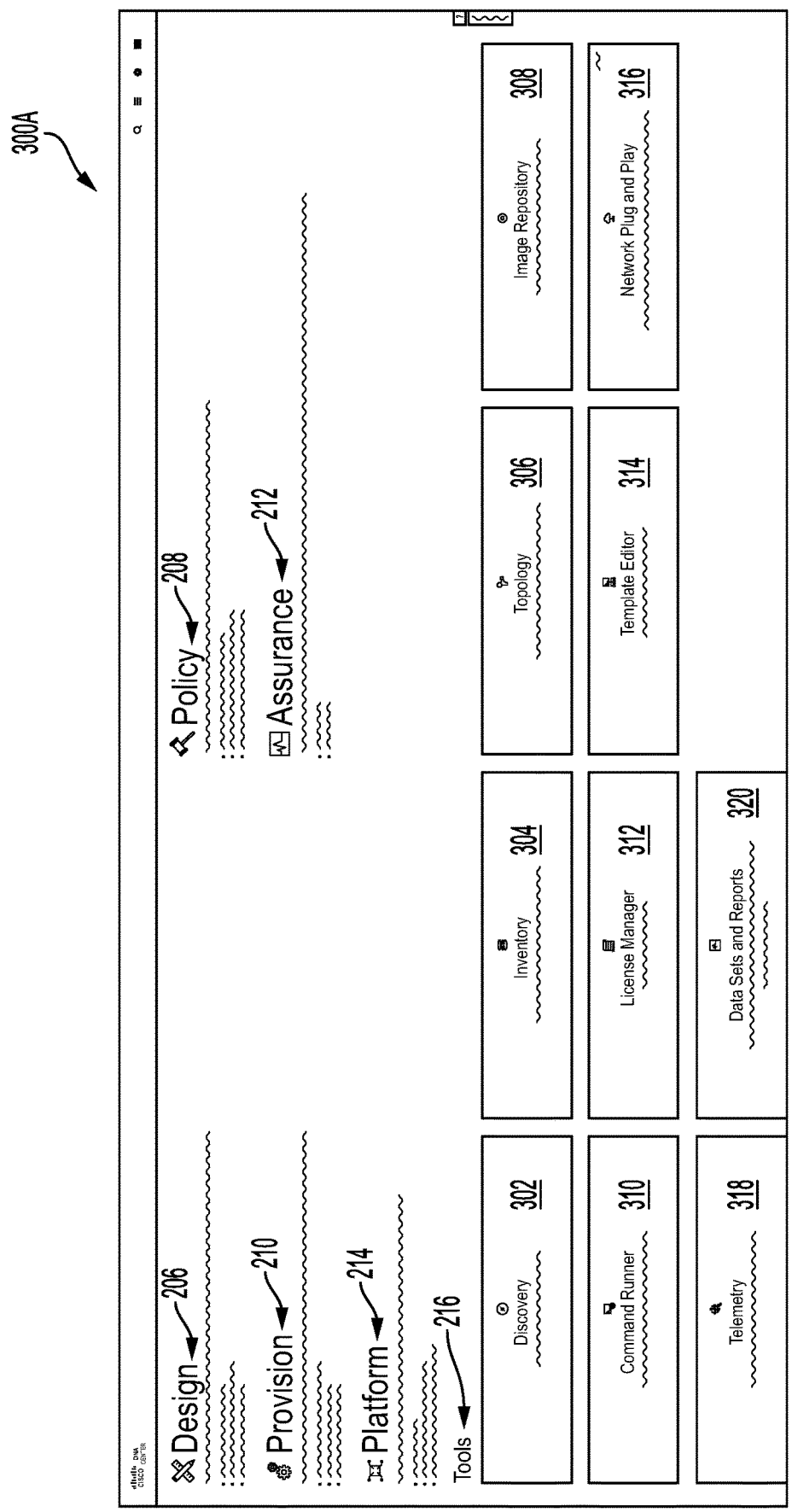
FIGS. 3A-3I illustrate examples of graphical user interfaces for a network management system in accordance with one aspect of the present disclosure.

FIG. 3A illustrates a graphical user interface 300A, which is an example of a landing screen or a home screen of the user interface 204. The graphical user interface 300A can include user interface elements for selecting the design functions 206, the policy functions 208, the provisioning functions 210, the assurance functions 212, and the platform functions 214. The graphical user interface 300A also includes user interface elements for selecting the base automation functions 216. In this example, the base automation functions 216 include:

A network discovery tool 302 for automating the discovery of existing network elements to populate into inventory;
An inventory management tool 304 for managing the set of physical and virtual network elements;
A topology tool 306 for visualizing the physical topology of network elements;
An image repository tool 308 for managing software images for network elements;
A command runner tool 310 for diagnosing one or more network elements based on a CLI;
A license manager tool 312 for administering visualizing software license usage in the network;
A template editor tool 314 for creating and authoring CLI templates associated with network elements in a design profile;
A network PnP tool 316 for supporting the automated configuration of network elements;
A telemetry tool 318 for designing a telemetry profile and applying the telemetry profile to network elements; and A data set and reports tool 320 for accessing various data sets, scheduling data extracts, and generating reports in multiple formats (e.g., Post Document Format (PDF), comma-separate values (CSV), Tableau, etc.), such as an inventory data report, a software image management (SWIM) server report, and a client data report, among others.

Figure 3B:
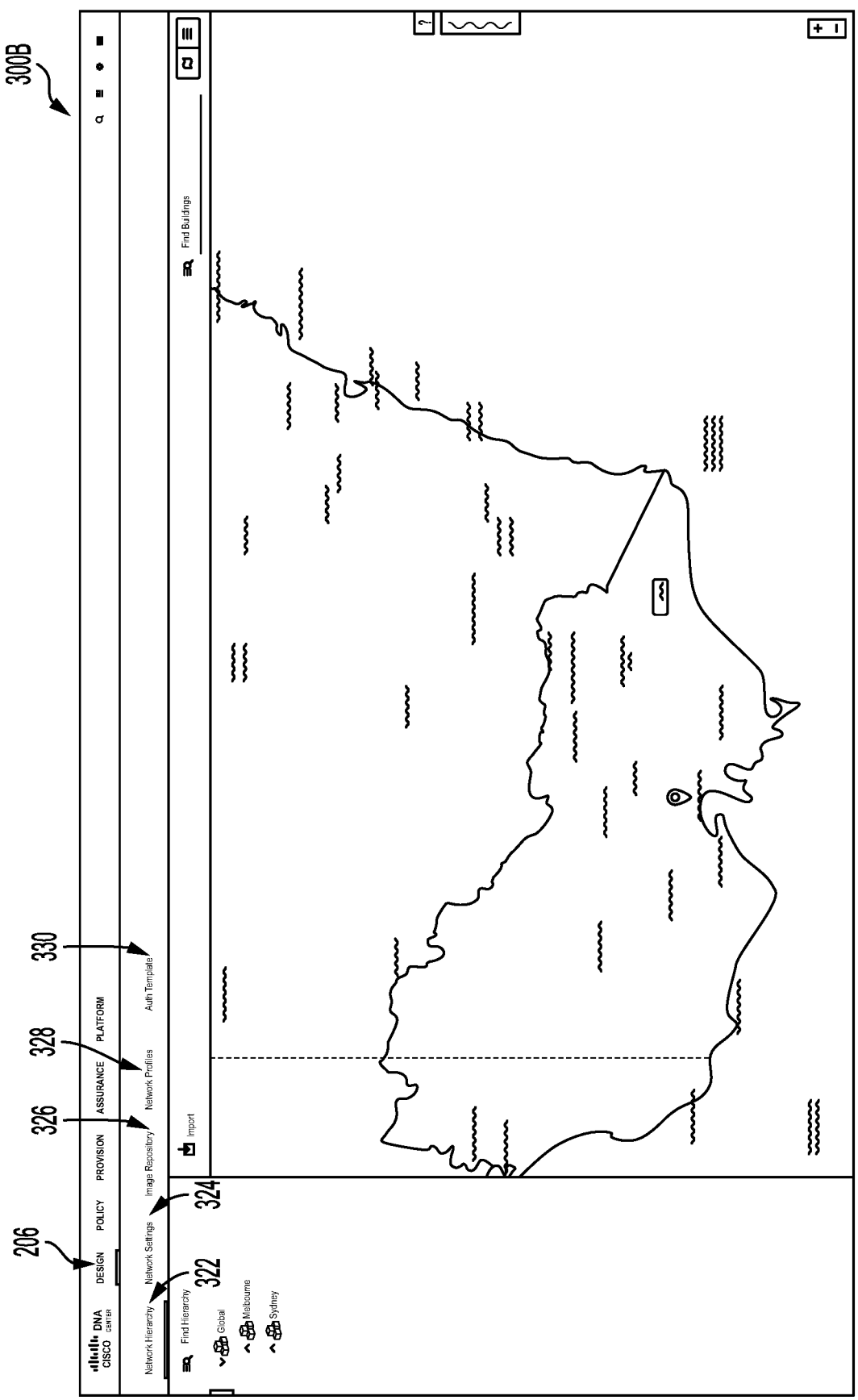

FIG. 3B illustrates a graphical user interface 300B, an example of a landing screen for the design functions 206. The graphical user interface 300B can include user interface elements for various tools and workflows for logically defining an enterprise network. In this example, the design tools and workflows include:

A network hierarchy tool 322 for setting up the geographic location, building, and floor plane details, and associating these with a unique site id;

A network settings tool 324 for setting up network servers (e.g., Domain Name System (DNS), DHCP, AAA, etc.), device credentials, IP address pools, service provider profiles (e.g., QoS classes for a WAN provider), and wireless settings;

An image management tool 326 for managing software images and/or maintenance updates, setting version compliance, and downloading and deploying images;

A network profiles tool 328 for defining LAN, WAN, and WLAN connection profiles (including Service Set Identifiers (SSIDs)); and An authentication template tool 330 for defining modes of authentication (e.g., closed authentication, Easy Connect, open authentication, etc.).

The output of the design workflow 206 can include a hierarchical set of unique site identifiers that define the global and forwarding configuration parameters of the various sites of the network. The provisioning functions 210 may use the site identifiers to deploy the network.

Figure 3C:
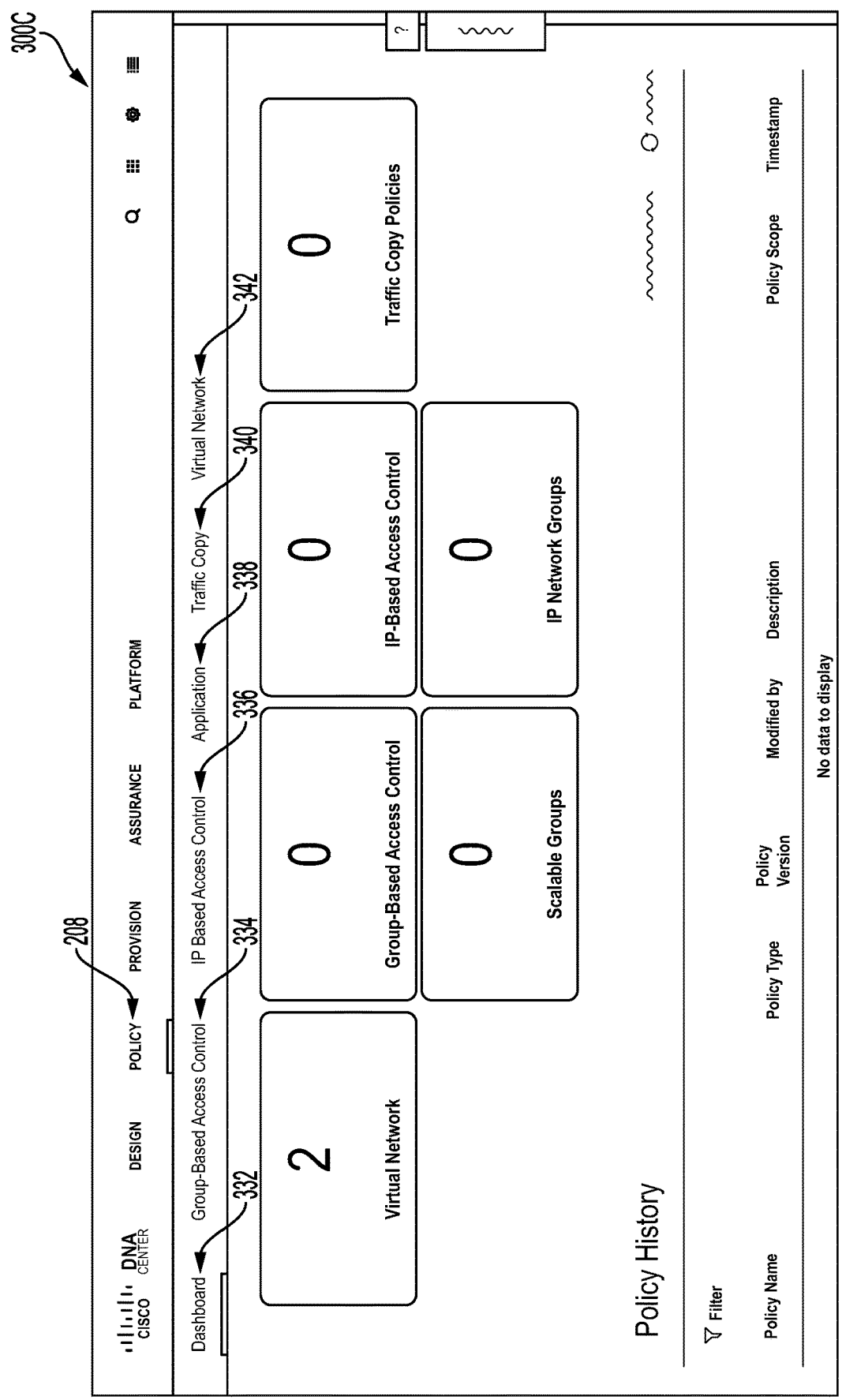

FIG. 3C illustrates a graphical user interface 300C, an example of a landing screen for the policy functions 208. The graphical user interface 300C can include various tools and workflows for defining network policies. In this example, the policy design tools and workflows include:

A policy dashboard 332 for viewing virtual networks, group-based access control policies, IP-based access control policies, traffic copy policies, scalable groups, and IP network groups. The policy dashboard 332 can also show the number of policies that have failed to deploy. The policy dashboard 332 can provide a list of policies and the following information about each policy: policy name, policy type, policy version (e.g., iteration of policy which can be incremented each time the policy changes, user who has modified the policy, description, policy scope (e.g., user and device groups or applications that the policy affects), and timestamp;

A group-based access control policies tool 334 for managing group-based access controls or SGACLs. A group-based access control policy can define scalable groups and an access contract (e.g., rules that make up the access control policies, such as permit or deny when traffic matches on the policy);

An IP-based access control policies tool 336 for managing IP-based access control policies. An IP-based access control can define an IP network group (e.g., IP subnets that share same access control requirements) and an access contract;

An application policies tool 338 for configuring QoS for application traffic. An application policy can define application sets (e.g., sets of applications that with similar network traffic needs) and a site scope (e.g., the site to which an application policy is defined);

A traffic copy policies tool 340 for setting up an Encapsulated Remote Switched Port Analyzer (ERSPAN) configuration such that network traffic flow between two entities is copied to a specified destination for monitoring or troubleshooting. A traffic copy policy can define the source and destination of the traffic flow to copy and a traffic copy contract that specifies the device and interface where the copy of traffic is sent; and A virtual network policies tool 343 for segmenting the physical network into multiple logical networks.

The output of the policy workflow 208 can include a set of virtual networks, security groups, and access and traffic policies that define the policy configuration parameters of the various sites of the network. The provisioning functions 210 may use the virtual networks, groups, and policies for deployment in the network.

Figure 3D:
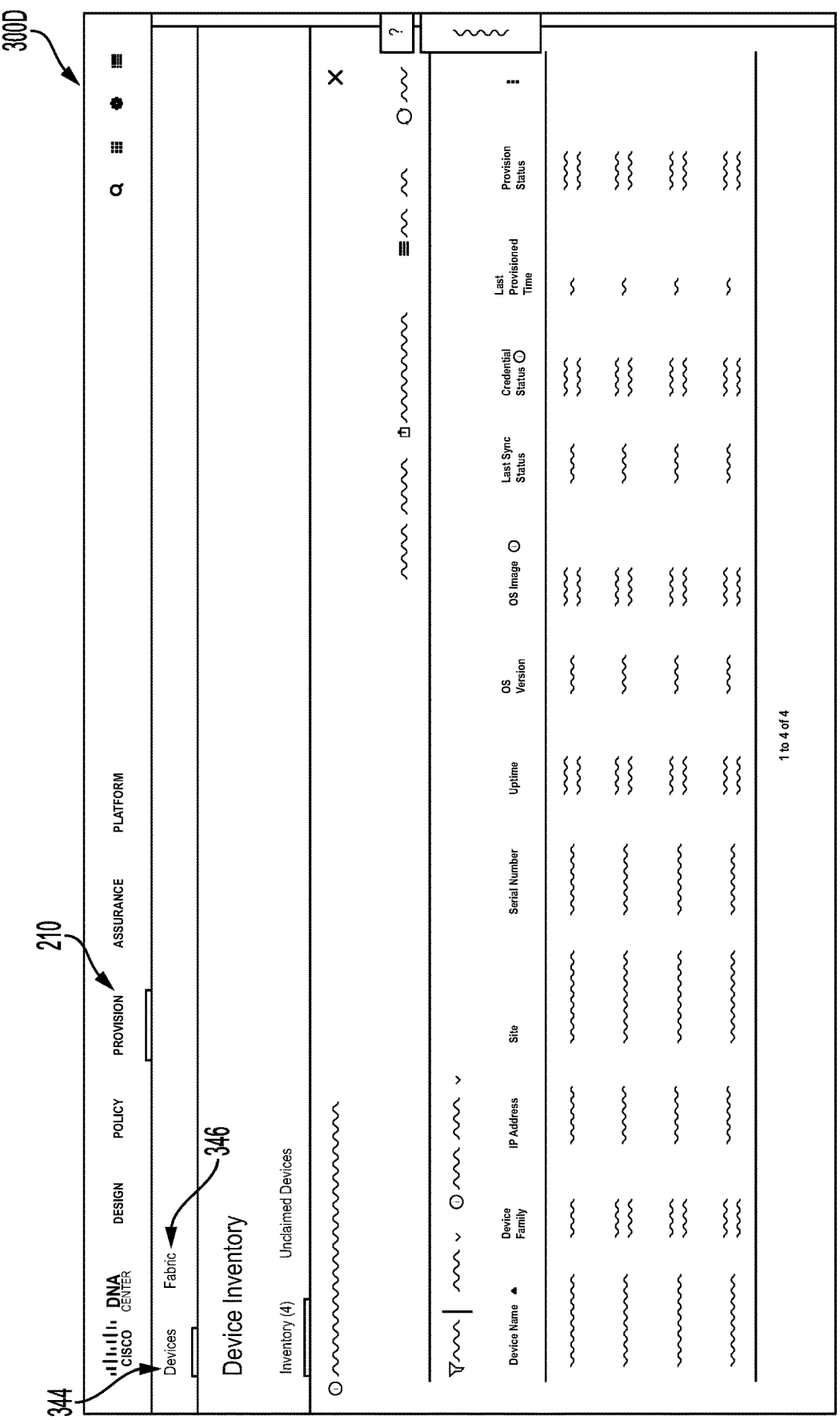

FIG. 3D illustrates a graphical user interface 300D, an example of a landing screen for the provisioning functions 210. The graphical user interface 300D can include various tools and workflows for deploying the network. In this example, the provisioning tools and workflows include:

A device provisioning tool 344 for assigning devices to the inventory and deploying the required settings and policies, and adding devices to sites; and A fabric provisioning tool 346 for creating fabric domains and adding devices to the fabric.

The output of the provisioning workflow 210 can include the deployment of the network underlay and fabric overlay, as well as policies (defined in the policy workflow 208).

Figure 3E:
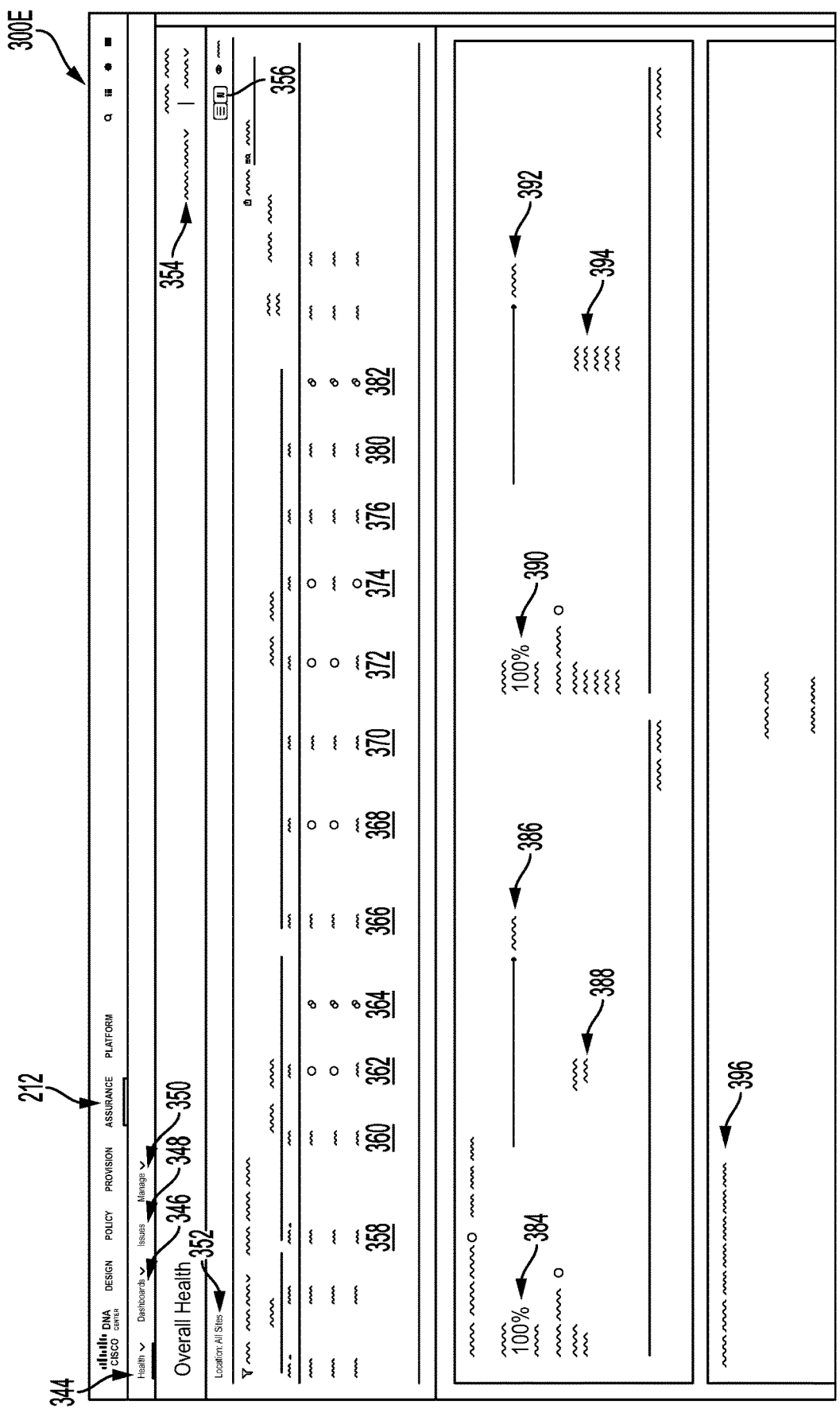

FIG. 3E illustrates a graphical user interface 300E, an example of a landing screen for the assurance functions 212. The graphical user interface 300E can include various tools and workflows for managing the network. In this example, the assurance tools and workflows include:

A health overview tool 344 for providing a global view of the enterprise network, including network infrastructure devices and endpoints. The user interface element (e.g., drop-down menu, a dialog box, etc.) associated with the health overview tool 344 can also be toggled to switch to additional or alternative views, such as a view of the health of network infrastructure devices alone, a view of the health of all wired and wireless clients, and a view of the health of applications running in the network as discussed further below with respect to FIGS. 3F-3H;

An assurance dashboard tool 346 for managing and creating custom dashboards;

An issues tool 348 for displaying and troubleshooting network issues; and

A sensor management tool 350 for managing sensor-driven tests.

The graphical user interface 300E can also include a location selection user interface element 352, a time period selection user interface element 354, and a view type user interface element 356. The location selection user interface element 354 can enable a user to view the overall health of specific sites (e.g., as defined via the network hierarchy tool 322) and/or network domains (e.g., LAN, WLAN, WAN, data center, etc.). The time period selection user interface element 356 can enable display of the overall health of the network over specific time periods (e.g., last 3 hours, last 24 hours, last 7 days, custom, etc.). The view type user interface element 355 can enable a user to toggle between a geographical map view of the sites of the network (not shown) or a hierarchical site/building view (as shown).

Within the hierarchical site/building view, rows can represent the network hierarchy (e.g. sites and buildings as defined by the network hierarchy tool 322); column 358 can indicate the number of healthy clients as a percentage; column 360 can indicate the health of wireless clients by a score (e.g., 1-10), color and/or descriptor (e.g., red or critical associated with a health score 1 to 3 indicating the clients have critical issues, orange or warning associated with a health score of 4 to 7 indicating warnings for the clients, green or no errors or warnings associated with a health score of 8 to 10, grey or no data available associated with a health score of null or 0), or other indicator; column 362 can indicate the health of wired clients by score, color, descriptor, and so forth; column 364 can include user interface elements for drilling down to the health of the clients associated with a hierarchical site/building; column 366 can indicate the number of healthy network infrastructure devices as a percentage; column 368 can indicate the health of access switches by score, color, descriptor, and so forth; column 370 can indicate the health of core switches by score, color, descriptor, and so forth; column 372 can indicate the health of distribution switches by score, color, descriptor, and so forth; column 374 can indicate the health of routers by score, color, descriptor, and so forth; column 376 can indicate the health of WLCs by score, color, descriptor, and so forth; column 378 can indicate the health of other network infrastructure devices by score, color, descriptor, and so forth; and column 380 can include user interface elements for drilling down to the health of the network infrastructure devices associated with a hierarchical site/building. In other embodiments, client devices may be grouped in other ways besides wired or wireless, such as by device type (e.g., desktop, laptop, mobile phone, IoT device or more specific type of IoT device, etc.), manufacturer, model, operating system, and so forth. Likewise, network infrastructure devices can also be grouped along these and other ways in additional embodiments.

The graphical user interface 300E can also include an overall health summary user interface element (e.g., a view, pane, tile, card, container, widget, dashlet, etc.) that includes a client health summary user interface element 384 indicating the number of healthy clients as a percentage, a color coded trend chart 386 indicating that percentage over a specific time period (e.g., as selected by the time period selection user interface element 354), a user interface element 388 breaking down the number of healthy clients as a percentage by client type (e.g., wireless, wired), a network infrastructure health summary user interface element 390 indicating the number of health network infrastructure devices as a percentage, a color coded trend chart 392 indicating that percentage over a specific time period, and a user interface element 394 breaking down the number of network infrastructure devices as a percentage by network infrastructure device type (e.g., core switch, access switch, distribution switch, etc.).

The graphical user interface 300E can also include an issues user interface element 396 listing issues, if any, that must be addressed. Issues can be sorted based on timestamp, severity, location, device type, and so forth. Each issue may be selected to drill down to view a more detailed view of the selected issue.

Figure 3F:
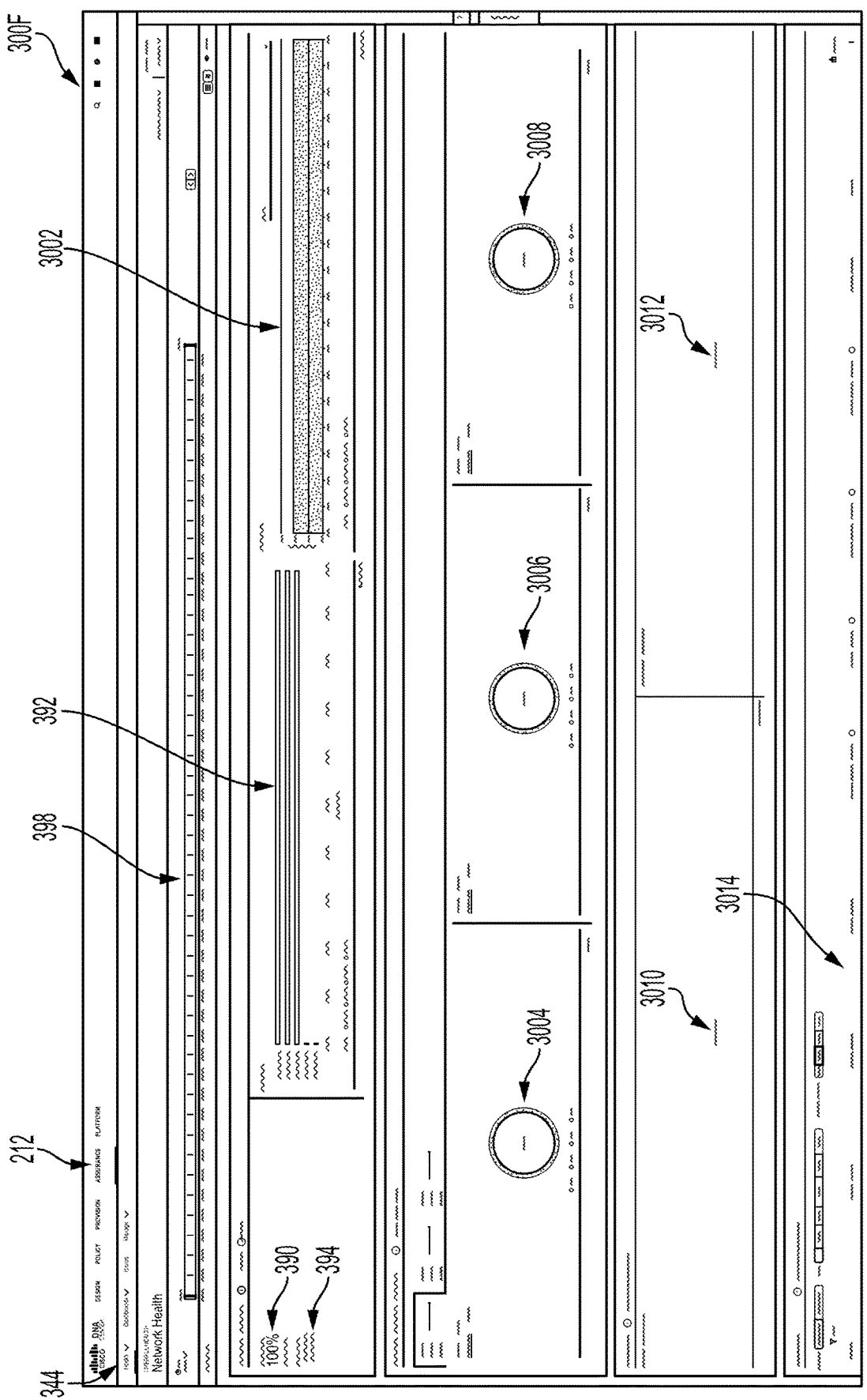

FIG. 3F illustrates a graphical user interface 300F, an example of a screen for an overview of the health of network infrastructure devices alone, which may be navigated to, for instance, by toggling the health overview tool 344. The graphical user interface 300F can include a timeline slider 398 for selecting a more granular time range than a time period selection user interface element (e.g., the time period selection user interface element 354). The graphical user interface 300F can also include similar information to that shown in the graphical user interface 300E, such as a user interface element comprising a hierarchical site/building view and/or geographical map view similar to that of the graphical user interface 300E (except providing information only for network infrastructure devices) (not shown here), the number of healthy network infrastructure devices as a percentage 390, the color coded trend charts 392 indicating that percentage by device type, the breakdown of the number of healthy network infrastructure devices by device type 394, and so forth. In addition, the graphical user interface 300F can display a view of the health of network infrastructure devices by network topology (not shown). This view can be interactive, such as by enabling a user to zoom in or out, pan left or right, or rotate the topology (e.g., by 90 degrees).

In this example, the graphical user interface 300F also includes a color coded trend chart 3002 showing the performance of the network infrastructure devices over a specific time period; network health by device type tabs including a system health chart 3004 providing system monitoring metrics (e.g., CPU utilization, memory utilization, temperature, etc.), a data plane connectivity chart 3006 providing data plane metrics, such as uplink availability and link errors, and a control plane connectivity chart 3008 providing control plane metrics for each device type; an AP analytics user interface element including an up and down color coded chart 3010 that provides AP status information (e.g., the number of APs connected to the network, and the number of APs not connected to the network, etc.) and a top number N of APs by client count chart 3012 that provides information about the APs that have the highest number of clients; a network devices table 3014 enabling a user to filter (e.g., by device type, health, or custom filters), view, and export network device information. A detailed view of the health of each network infrastructure device can also be provided by selecting that network infrastructure device in the network devices table 3014.

Figure 3G:
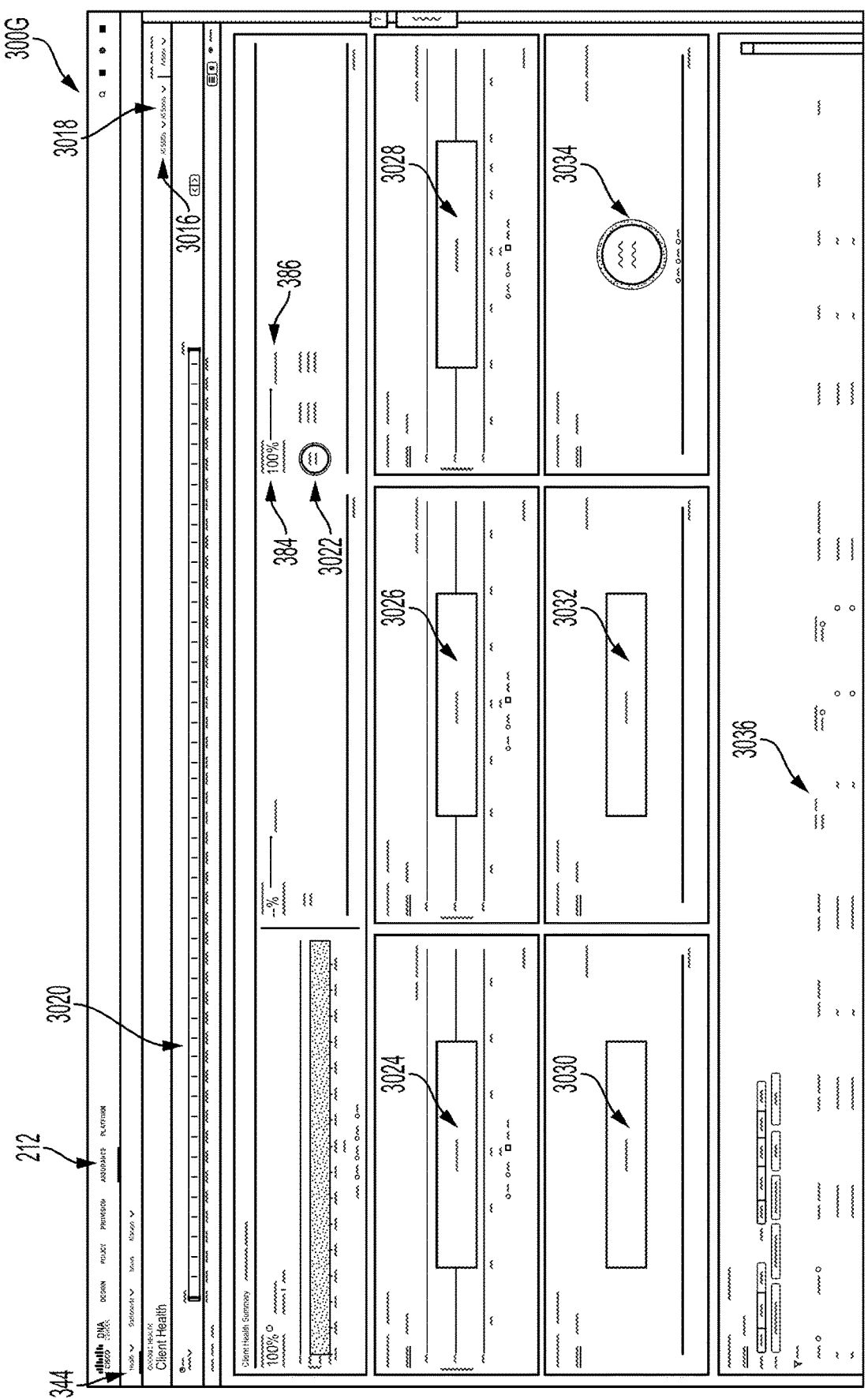

FIG. 3G illustrates a graphical user interface 300G, an example of a screen for an overview of the health of client devices, which may be navigated to, for instance, by toggling the health overview tool 344. The graphical user interface 300G can include an SSID user interface selection element 3016 for viewing the health of wireless clients by all SSIDs or a specific SSID, a band frequency user interface selection element 3018 for viewing the health of wireless clients by all band frequencies or a specific band frequency (e.g., 2.4 GHz, 5 GHz, etc.), and a time slider 3020 that may operate similarly to the time slider 398.

The graphical user interface 300G can also include a client health summary user interface element that provides similar information to that shown in the graphical user interface 300E, such as the number of healthy clients as a percentage 384 and a color coded trend chart 386 indicating that percentage over a specific time period for each grouping of client devices (e.g., wired/wireless, device type, manufacturer, model, operating system, etc.). In addition, the client health summary user interface element can include a color-coded donut chart that provides a count of poor (e.g., red and indicating a client health score of 1 to 3), fair (e.g., orange and indicating a client health score of 4 to 7), good (e.g., green and indicating a health score of 8 to 10), and inactive (e.g., grey and indicating a health score that is null or 0) client devices. The count of client devices associated with each color, health score, health descriptor, and so forth may be displayed by a selection gesture directed toward that color (e.g., tap, double tap, long press, hover, click, right-click, etc.).

The graphical user interface 300G can also include a number of other client health metric charts in all sites or a selected site over a specific time period, such as:

Client onboarding times 3024;
Received Signal Strength Indications (RSSIs) 3026;
Connectivity signal-to-noise ratios (SNRs) 3028;
Client counts per SSID 3030;
Client counts per band frequency 3032;
DNS requests and response counters (not shown); and
Connectivity physical link state information 3034 indicating the distribution of wired client devices that had their physical links up, down, and had errors.

In addition, the graphical user interface 300G can include a client devices table 3036 enabling a user to filter (e.g., by device type, health, data (e.g., onboarding time>threshold, association time>threshold, DHCP>threshold, AAA>threshold, RSSI>threshold, etc.), or custom filters), view, and export client device information (e.g., user identifier, hostname, MAC address, IP address, device type, last heard, location, VLAN identifier, SSID, overall health score, onboarding score, connection score, network infrastructure device to which the client device is connected, etc.). A detailed view of the health of each client device can also be provided by selecting that client device in the client devices table 3036.

Figure 3H:
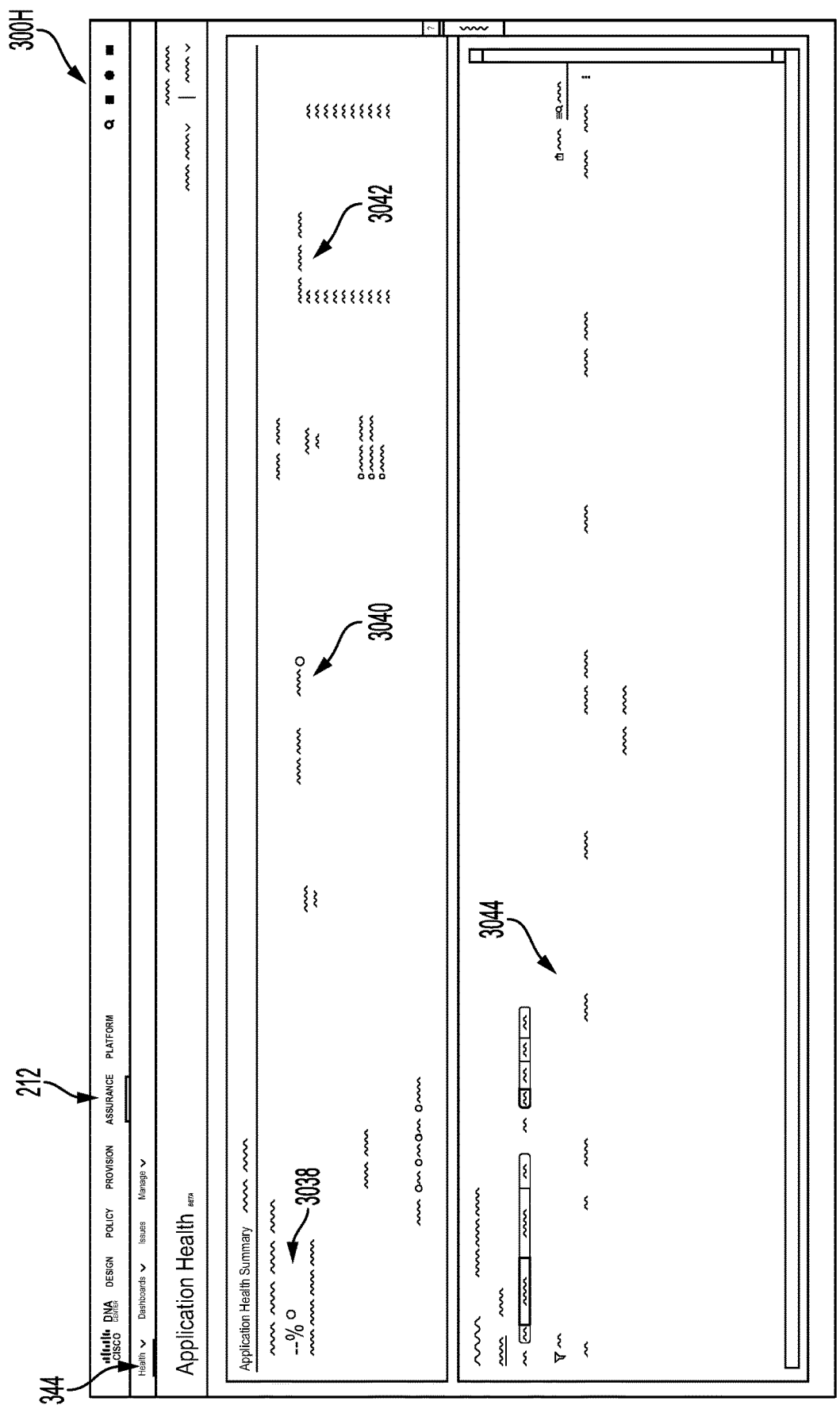

FIG. 3H illustrates a graphical user interface 300H, an example of a screen for an overview of the health of applications, which may be navigated to, for instance, by the toggling the health overview tool 344. The graphical user interface 300H can include application health summary user interface element including a percentage 3038 of the number of healthy applications as a percentage, a health score 3040 for each application or type of application (e.g., business relevant, business irrelevant, default; HTTP, VoIP, chat, email, bulk transfer, multimedia/streaming, etc.) running in the network, a top number N of applications by usage chart 3042. The health score 3040 can be calculated based on an application's qualitative metrics, such as packet loss, network latency, and so forth.

In addition, the graphical user interface 300H can also include an applications table 3044 enabling a user to filter (e.g., by application name, domain name, health, usage, average throughput, traffic class, packet loss, network latency, application latency, custom filters, etc.), view, and export application information. A detailed view of the health of each application can also be provided by selecting that application in the applications table 3044.

Figure 3I:
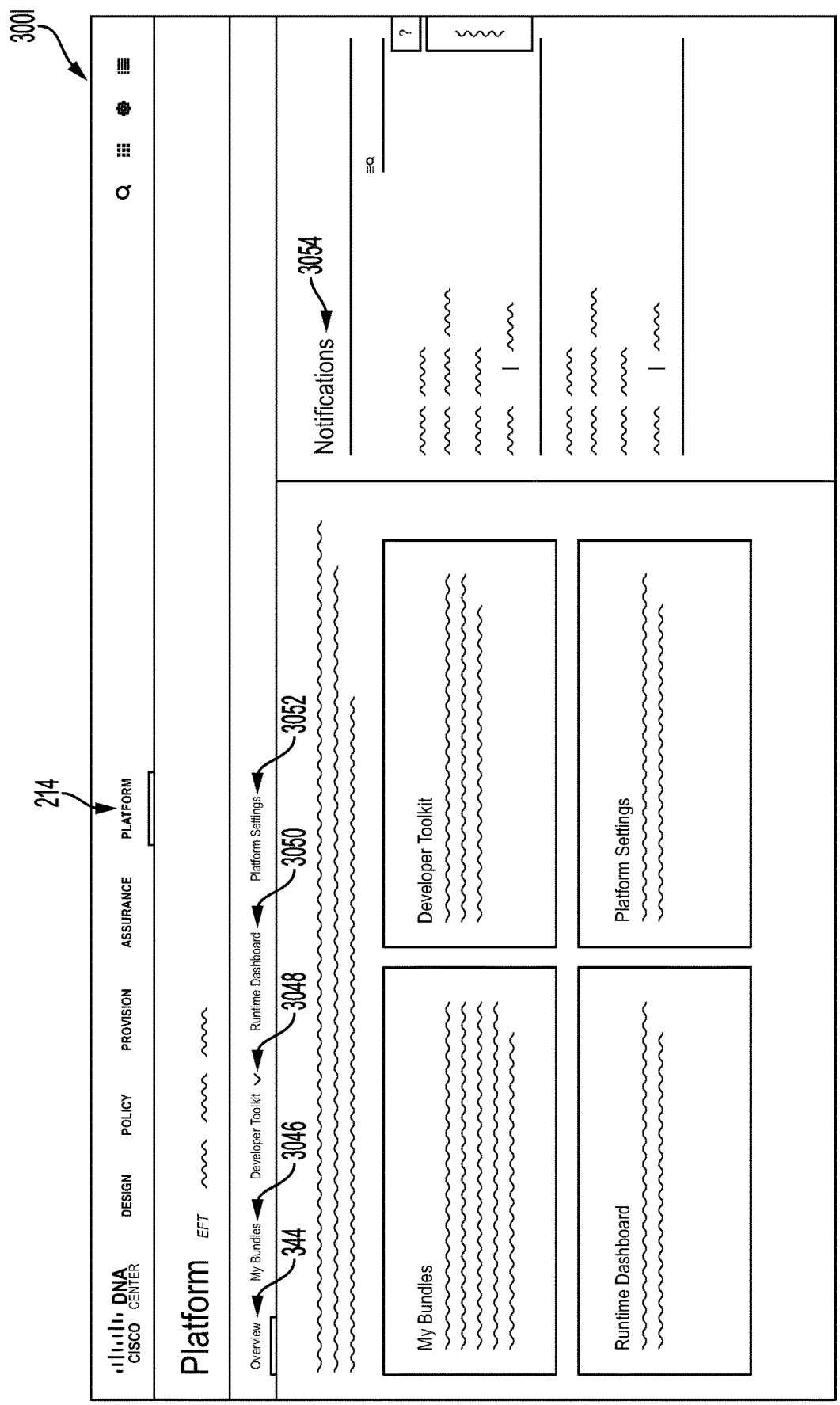

FIG. 3I illustrates an example of a graphical user interface 300I, an example of a landing screen for the platform functions 210. The graphical user interface 300C can include various tools and workflows for integrating with other technology systems. In this example, the platform integration tools and workflows include:

A bundles tool 3046 for managing packages of domain-specific APIs, workflows, and other features for network programming and platform integration;
A developer toolkit 3048 for accessing an API catalog listing the available APIs and methods (e.g., GET, PUT, POST, DELETE, etc.), descriptions, runtime parameters, return codes, model schemas, and so forth. In some embodiments, the developer toolkit 3048 can also include a "Try It" button to permit a developer to experiment with a particular API to better understand its behavior;
A runtime dashboard 3050 for viewing and analyzing basic metrics or API and integration flow usage;
A platform settings tool 3052 to view and set global or bundle-specific settings that define integration destinations and event consumption preferences; and
A notifications user interface element 3054 for presenting notifications regarding the availability of software updates, security threats, and so forth.

Returning to FIG. 2, the controller layer 220 can comprise subsystems for the management layer 220 and may include a network control platform 222, a network data platform 224, and AAA services 226. These controller subsystems can form an abstraction layer to hide the complexities and dependencies of managing many network elements and protocols.

The network control platform 222 can provide automation and orchestration services for the network layer 230 and the physical layer 240, and can include the settings, protocols, and tables to automate management of the network and physical layers. For example, the network control platform 230 can provide the design functions 206, the provisioning functions 208 212. In addition, the network control platform 230 can include tools and workflows for discovering switches, routers, wireless controllers, and other network infrastructure devices (e.g., the network discovery tool 302); maintaining network and endpoint details, configurations, and software versions (e.g., the inventory management tool 304); Plug-and-Play (PnP) for automating deployment of network infrastructure (e.g., the network PnP tool 316), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 222 can communicate with network elements using Network Configuration (NETCONF)/Yet Another Next Generation (YANG), Simple Network Management Protocol (SNMP), Secure Shell (SSH)/Telnet, and so forth. In some embodiments, the Cisco® Network Control Platform (NCP) can operate as the network control platform 222

The network data platform 224 can provide for network data collection, analytics, and assurance, and may include the settings, protocols, and tables to monitor and analyze network infrastructure and endpoints connected to the network. The network data platform 224 can collect multiple types of information from network infrastructure devices, including syslog, SNMP, NetFlow, Switched Port Analyzer (SPAN), and streaming telemetry, among others. The network data platform 224 can also collect use contextual information shared from In some embodiments, one or more Cisco DNA™ Center appliances can provide the functionalities of the management layer 210, the network control platform 222, and the network data platform 224. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances can also be cloud-tethered to provide for the upgrade of existing functions and additions of new packages and applications without having to manually download and install them.

The AAA services 226 can provide identity and policy services for the network layer 230 and physical layer 240, and may include the settings, protocols, and tables to support endpoint identification and policy enforcement services. The AAA services 226 can provide tools and workflows to manage virtual networks and security groups, and to create group-based policies and contracts. The AAA services 226 can identify and profile network infrastructure devices and endpoints using AAA/RADIUS, 802.1X, MAC Authentication Bypass (MAB), web authentication, and EasyConnect, among others. The AAA services 226 can also collect and use contextual information from the network control platform 222, the network data platform 224, and the shared services 250, among others. In some embodiments, Cisco® ISE can provide the AAA services 226.

The network layer 230 can be conceptualized as a composition of two layers, an underlay 234 comprising physical and virtual network infrastructure (e.g., routers, switches, WLCs, etc.) and a Layer 3 routing protocol for forwarding traffic, and an overlay 232 comprising a virtual topology for logically connecting wired and wireless users, devices, and things and applying services and policies to these entities. Network elements of the underlay 234 can establish connectivity between each other, such as via Internet Protocol (IP). The underlay may use any topology and routing protocol.

In some embodiments, the network controller 104 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 232 can be a logical, virtualized topology built on top of the physical underlay 234, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane is where intent can be translated into network policy. That is, the policy plane is where the network operator can instantiate logical network policy based on services offered by the network fabric 120, such as security segmentation services, quality of service (QoS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNI) and Scalable Group Tag (SGT) fields in packet headers. The network fabric 120 can support both macro-segmentation and micro-segmentation. Macro-segmentation logically separates a network topology into smaller virtual networks by using a unique network identifier and separate forwarding tables. This can be instantiated as a virtual routing and forwarding (VRF) instance and referred to as a virtual network (VN). That is, a VN is a logical network instance within the network fabric 120 defined by a Layer 3 routing domain and can provide both Layer 2 and Layer 3 services (using the VXLAN VNI to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 120. It can be used as source and destination classifiers in Scalable Group ACLs (SGACLs). The SGT can be used to provide address-agnostic group-based policies.

In some embodiments, the fabric control plane node 110 may implement the Locator/Identifier Separation Protocol (LISP) to communicate with one another and with the management cloud 102. Thus, the control plane nodes may operate a host tracking database, a map server, and a map resolver. The host tracking database can track the endpoints 130 connected to the network fabric 120 and associate the endpoints to the fabric edge nodes 126, thereby decoupling an endpoint's identifier (e.g., IP or MAC address) from its location (e.g., closest router) in the network.

The physical layer 240 can comprise network infrastructure devices, such as switches and routers 110, 122, 124, and 126 and wireless elements 108 and 128 and network appliances, such as the network controller appliance(s) 104, and the AAA appliance(s) 106.

The shared services layer 250 can provide an interface to external network services, such as cloud services 252; Domain Name System (DNS), DHCP, IP Address Management (IPAM), and other network address management services 254; firewall services 256; Network as a Sensor (Naas)/Encrypted Threat Analytics (ETA) services; and Virtual Network Functions (VNFs) 260; among others. The management layer 202 and/or the controller layer 220 can share identity, policy, forwarding information, and so forth via the shared services layer 250 using APIs.

With the above examples of physical and logical architectures of enterprise networks and example UIs for management thereof, the disclosure now turns example embodiments for context aware based adjustment focal point for displaying network sites on a dashboard for network operators.

Currently, when a network operator of an enterprise network such as network 100, access a dashboard of network controller component/appliance 104 (a Dynamic Network Access Controller (DNAC)) via a user terminal, he or she may have a screen displayed that depicts a world map with virtual pins identifying various sites at which enterprise network 100 is deployed. Such world map with virtual pins (or dots or any other known or to be developed identifier) is displayed to any network operator who logs into such DNAC 104 and is available, regardless of access level or access privilege of the logged in network operator. Hereinafter, example embodiments will be described for adjusting the displayed map of network sites based on a given operators access privilege and other factors as will be described.

Figure 4:
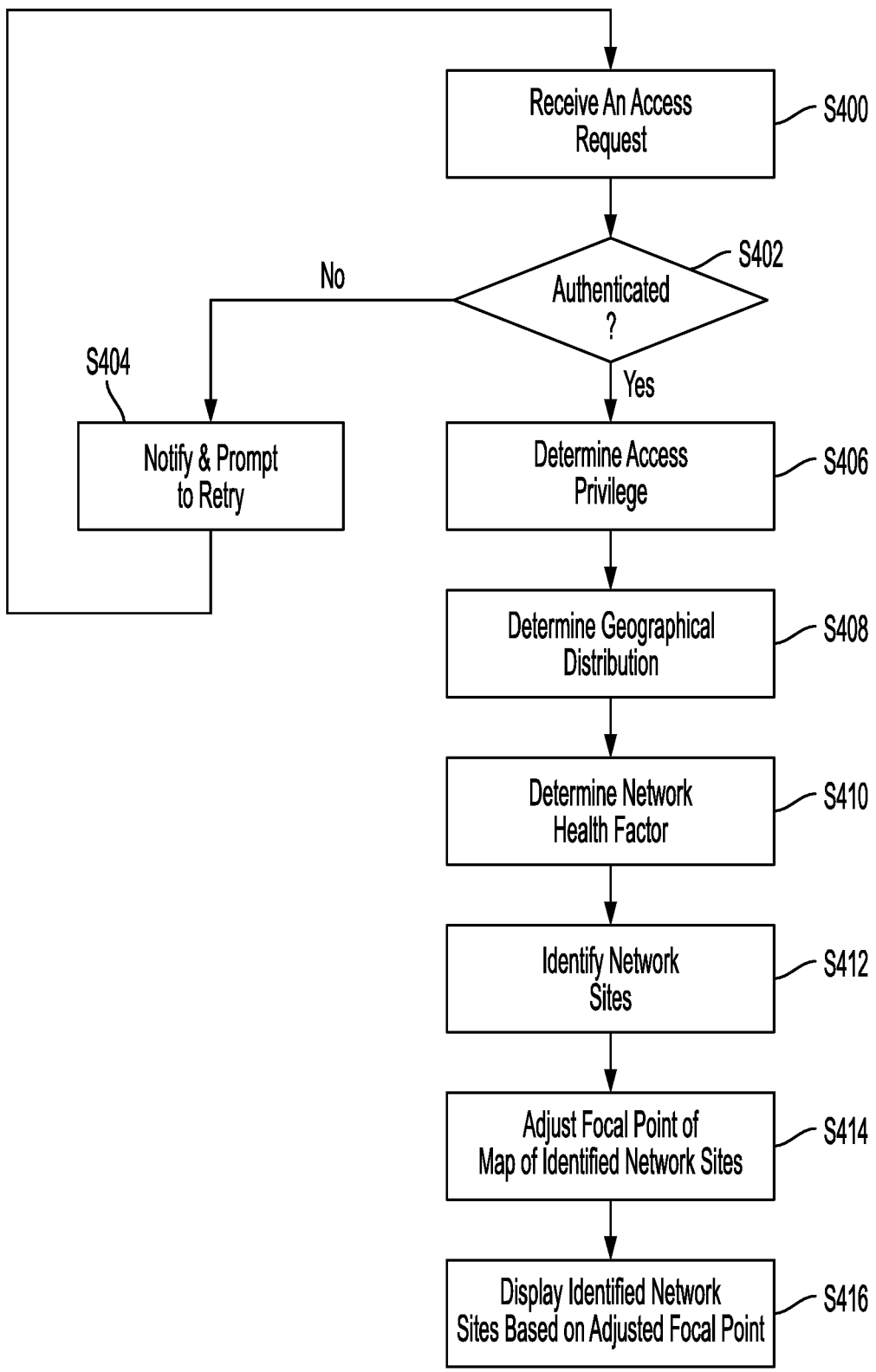
FIG. 4 illustrates a method of access privileged based adjustment of displayed network sites, according to an aspect of the present disclosure.

FIG. 4 illustrates a method of access privileged based adjustment of displayed network sites, according to an aspect of the present disclosure. FIG. 4 will be described from the perspective of DNAC 104. However, it will be understood that DNAC 104 may have one or more memories having computer-readable instructions, which when executed by one or more associated processors, cause such one or more processors to implement the process of FIG. 4, as will be described below. Furthermore, with reference to FIG. 4, it is assumed that enterprise network 100 is operated by a service provider (a Managed Service Provider (MSP)).

At S400, DNAC 104 receives an access request from a network operator to access a network controller management dashboard (example screenshots of which are described above with reference to FIGS. 3A-I). Such access request may be provided via a terminal connected to network 100 or can be any one of endpoints 130A-F of FIG. 1. In one example, such access request can include an assigned username/password for the network operator (user credentials).

At S402, DNAC 104 authenticates the received user credentials. If successfully authenticated, the process proceeds to S406, which will be described below. If not, at S404, DNAC 104 notifies the terminal via which the access request was received, of the denial of access and may prompt the network operator to provide user credentials again. Thereafter, S400, and S402 are repeated until user credentials are authenticated.

At S406, DNAC 104 determines an access privilege (first filtering criteria) associated with the access request received at S400. In other words, at S402, DNAC 104 determines which networks sites, the network operator from whom the access request was received at S400, are accessible to the network operator.

At S408, DNAC 104 determines geographical distributions (second filtering criteria) of all sites (network sites, venues, nodes, etc.) of network 100. For example, DNAC 104 determines whether all sites are all within a given local zone (e.g., a specific zip code), a city, a state, a region, a country, a continent, etc.

At S410, DNAC 104 determines network health factor(s) (third filtering criteria) for network sites being managed by network operator for whom the access request was received at S400. In one example, such network health factor(s) can be specified by a network operator in advance for identifying accessible sites that may require troubleshooting. Such network health factor(s) include, but are not limited to, (1) a percentage (which can be a configurable parameter determined based on experiments and/or empirical studies) of client association rejections for client devices (e.g., wireless end points 130A-F) that have attempted to associate with a network node/site over a given time frame (which can be a configurable parameter determined based on experiments and/or empirical studies); (2) a percentage (which can be a configurable parameter determined based on experiments and/or empirical studies) of access points (APs) down in a given site over a given period of time (which can be a configurable parameter determined based on experiments and/or empirical studies); (3) a number (which can be a configurable parameter determined based on experiments and/or empirical studies) of Dynamic Frequency Selection (DFS) Hits over a given time frame (which can be a configurable parameter determined based on experiments and/or empirical studies); (4) a number (which can be a configurable parameter determined based on experiments and/or empirical studies) of coverage holes over a given period of time (which can be a configurable parameter determined based on experiments and/or empirical studies); (5) a percentage (which can be a configurable parameter determined based on experiments and/or empirical studies) of capacity reduction over a given time period (which can be a configurable parameter determined based on experiments and/or empirical studies); (6) a percentage (which can be a configurable parameter determined based on experiments and/or empirical studies) of APs with Quality of Service Enhanced Basic Service Set (QBSS) higher than a threshold (which can be expressed as a percentage and is a configurable parameter determined based on experiments and/or empirical studies); (7) WAN link failures on a given site or list of sites over a period of time (which can be a configurable parameter determined based on experiments and/or empirical studies), etc.

At S412 and based on the first, second and third filter criteria, DNAC 104 filters (identifies) network sites to be displayed for the network operator for whom access request is received at S400. Examples first, second and third factors of S406, S408 and S410, provide context related to an access request by a network operator. Accordingly and as will be described, DNAC 104 is then capable of to taking these contexts into consideration to automatically filter, from among all network sites of an enterprise network, only a subset of "relevant" network sites that are accessible to the requesting network operator and/or are of interest to the requesting network operator, which may then be presented to the corresponding network operator. This may be referred to as a context aware filtering of focal point of maps displaying network sites on a dashboard.

In one example, filtering can be based on a weighted combination of all of the above non-limiting example factors or any single one of them. For example, sites may be identified solely based on network operator's access privilege. In another example, sites may be identified based on network operator's access privilege and the third filter criteria, where, from among sites to which the network operator has access, only those that meet the network health factor(s) of S410 are identified for presentation to the network operator. A network site can be a fully deployed enterprise network within a given geographical location such as network 100 to which endpoints (user devices) are connected, may be a limited network that includes a subset of components, can be a single access point remotely and communicatively coupled to a larger enterprise network, etc.

At S414, DNAC 104 adjusts focal point of a map of the identified networks sites of S412. In one example, adjusting the focal point is based on applying a clustering method on the identified network sites of S412. The identified sites can be clustered by, for example, zip codes, zip codes can be clustered by counties, counties can be clustered by states, etc. In one example, Hierarchical Agglomerative Clustering (HAC) algorithm is used to create a pyramid of clusters. HAC is "bottom-up" (agglomerative) by definition, which indicates that each site starts off as its own cluster and pairs of nearest clusters are merged together during a move up the hierarchy. In one example, geographical distance is used as a parameter to identify nearest clusters and determine the hierarchy.

Figure 5:
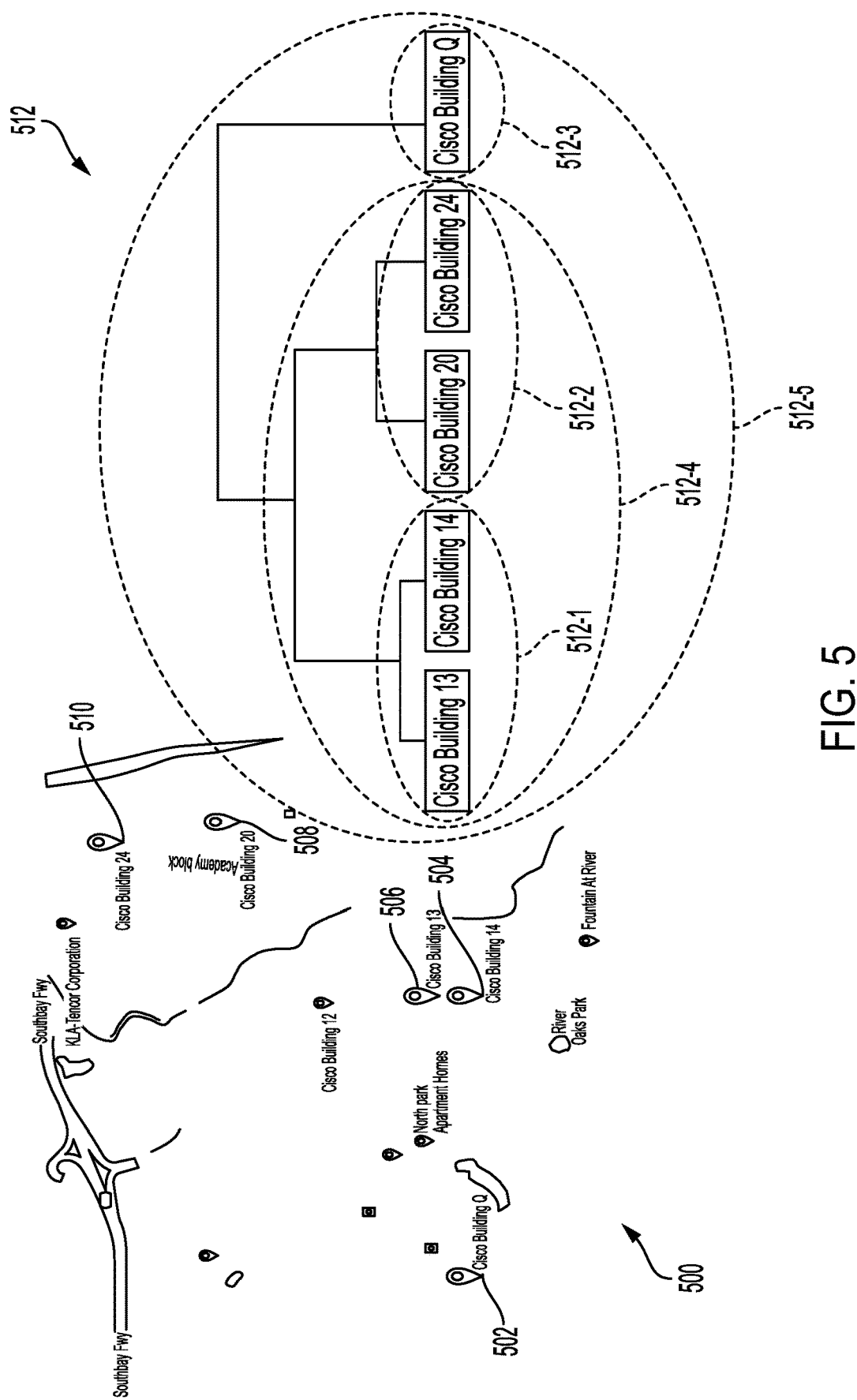
FIG. 5 illustrates an example of site clustering, according to one aspect of the present disclosure.

FIG. 5 illustrates an example of site clustering, according to one aspect of the present disclosure. Map 500 shows an example of 5 network sites of network 100 (sites 502, 504, 506, 508 and 510) identified at S412 and a corresponding resulting clustering output 512. In one example, sites 504 and 506 are closest to each other distance wise and thus form one cluster 512-1. Similarly sites 508 and 510 are closest to each other and form cluster 512-2 while site 502 forms its own separate cluster 512-3. Thereafter, cluster 512-1 and 512-2 are closets to one another distance wise, relative to cluster 512-3. Accordingly, at next hierarchical level, clusters 512-1 and 512-2 form a single cluster 512-4, which itself forms the head/top cluster 512-5 with cluster 512-3.

Referring back to FIG. 4, clustering of sites of network 100 can continue until one global level cluster is created for all sites of network 100. However, such clustering can be limited based on a predefined parameter (determined based on experiments and/or empirical studies). For example, clustering can be limited to 3 levels, which in the context of non-limiting example of FIG. 5 would stop at sites shown on map 500. Otherwise, clustering of sites 502, 504, 506, 508 and 510 would continue until all sites of network 100 around the globe are covered and clustered.

At S416, DNAC 104, displays (provides an interactive visual rendering of) clusters and associated sites on a display of a device via with the access request was received at S400. In one example, at S416, map 500 of FIG. 5 may be displayed for the network operator. Such map may be interactive, where network operator may select any of the identified sites to obtain a more detailed view of network components at the selected site, view device statistics, manage or modify the devices, etc.

In one example, clustering of identified sites at S414 may not necessarily be limited to a given geographical location. For example, there may be one cluster of identified sites in northern California while another cluster of site(s) may be in southern California. Accordingly, at S416, DNAC 104 may provide a map-in-map display of the clusters of identified sites to network operator.

Figure 6:
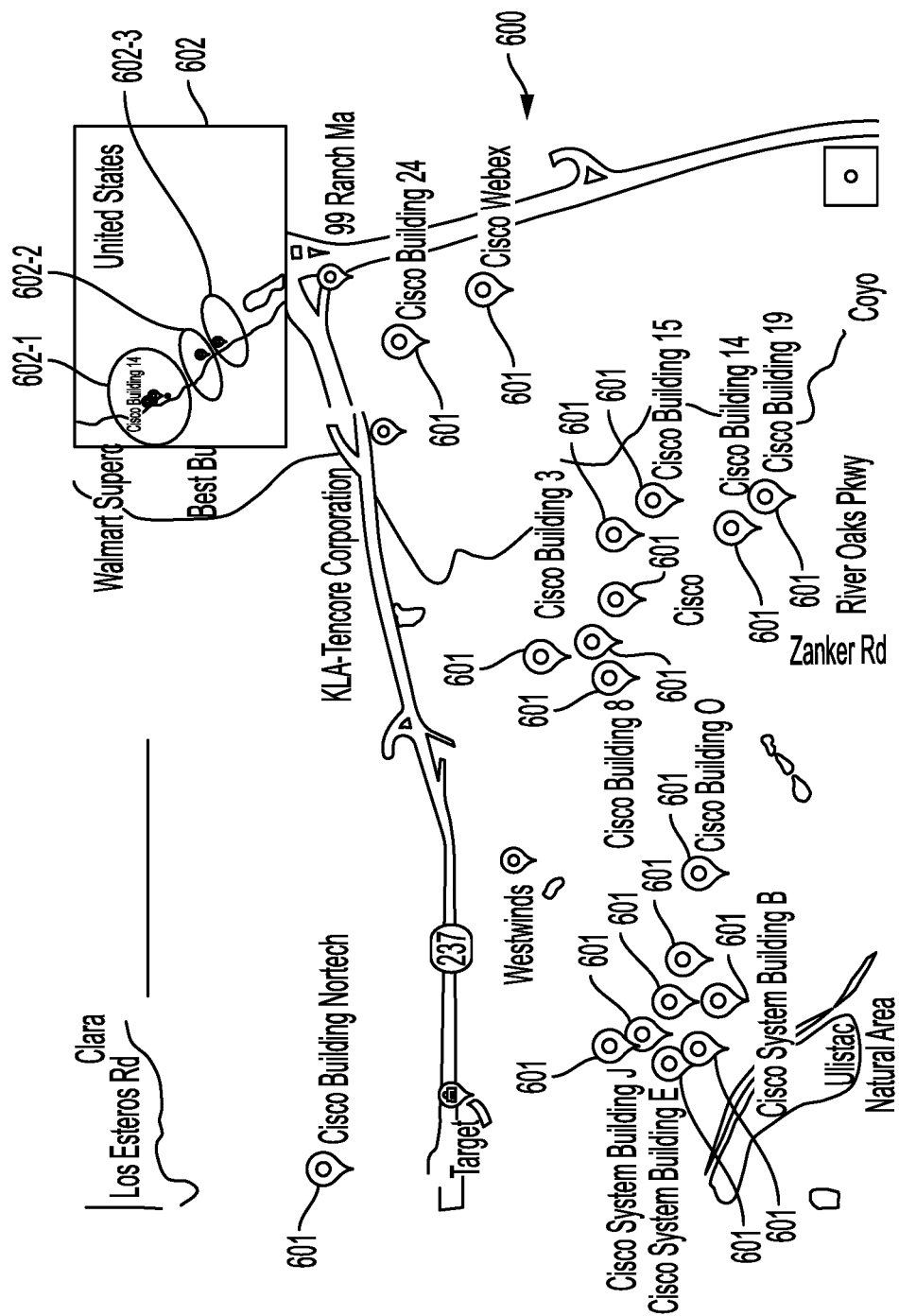
FIG. 6 illustrates an example map-in-map view of clusters of identifies sites of FIG. 4, according to one aspect of the present disclosure.

FIG. 6 illustrates an example map-in-map view of clusters of identifies sites of FIG. 4, according to one aspect of the present disclosure. In describing FIG. 6, an assumption is made that clustering of identifies sites at S414 results in three clusters of site(s).

FIG. 6 illustrates a map-in-map view of identified network sites. Map 600 is a zoomed-in (adjusted) view of all identified sites 601 within a given cluster. Map 602 provides a broader view of all example three clusters 602-1, 602-2 and 602-3. For example, cluster 602-1 includes all identifies Cisco sites in San Jose, Calif., cluster 602-2 includes Cisco sites in Los Angeles, Calif. and cluster 602-3 includes Cisco sites in San Diego, Calif. All sites in clusters 602-1, 602-2 and 602-3 are accessible to network operator for whom access request was received at S400.

Map 600 is a zoomed-in (adjusted) view of cluster 602-1. Map-inmap view of FIG. 6 can again be interactive, such that network operator may be able to click on map 602 to blow it up, while map 600 is then reduced in size to be displayed within blown up map 602. Therein, network operator may be able to interact with map 602 to select a cluster and/or any number of identified site(s) therein for purposes including, but not limited to, obtaining a more detailed view of network components at the selected site, viewing device statistics, managing or modifying the devices, etc.

In another example, a most important of the identified clusters may be displayed at S416, where the important may be determined based on any number of defined criteria including but not limited to, a cluster with a highest number of sites, a cluster with a highest amount of network traffic, etc. Any remaining cluster of site(s) may be displayed adjacent to map 600 as a printed list, which network operator can click on to select and view a corresponding map. In other words, map-in-map view of FIG. 6 may be replaced with a map view of cluster 602-1 while clusters 602-2 and 602-3 are provided as a side list that network operator can click on and select to have a corresponding map shown instead of map of cluster 602-1.

With above examples of determining access privilege based network sites and displaying thereof, the disclosure now turns to example embodiments of systems that can be implemented as any one of DNAC 104, AP 402/404, switch 406 and/or WLC 408.

Figure 7A:
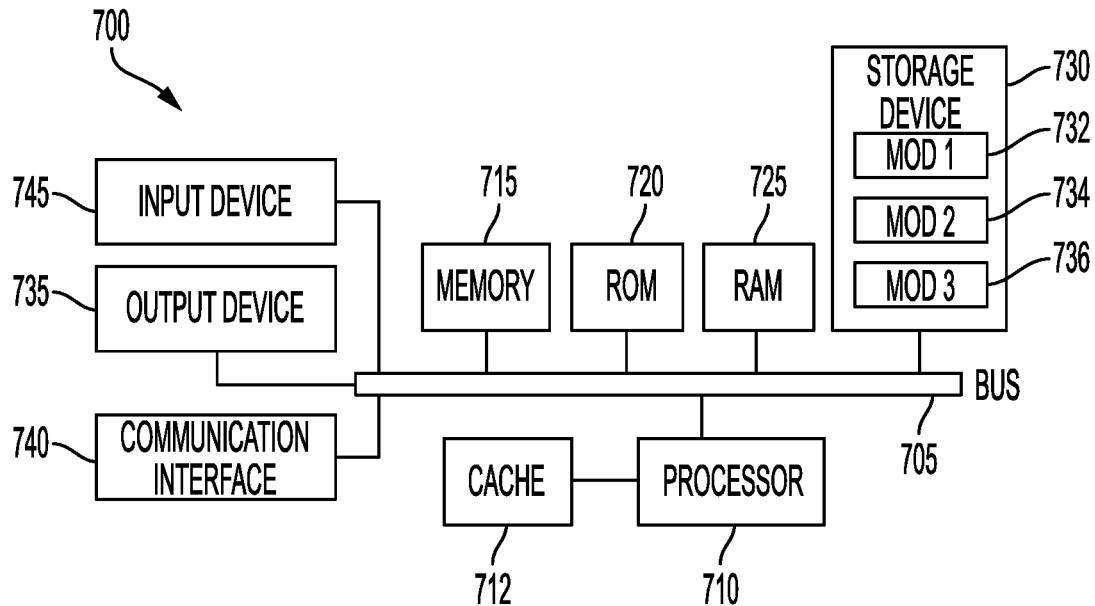
FIGS. 7A and 7B illustrate examples of systems in accordance with one aspect of the present disclosure.
Figure 7B:
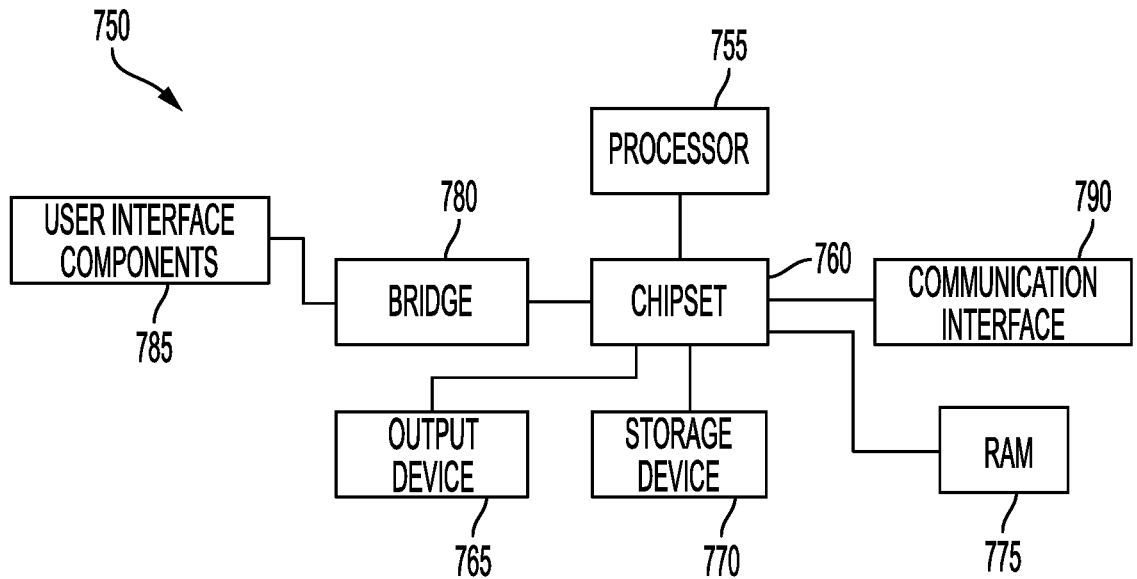

FIGS. 7A and 7B illustrate examples of systems in accordance with one aspect of the present disclosure.

FIG. 7A illustrates an example of a bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) 720 and random access memory (RAM) 725, to the processor 710. The computing system 700 can include a cache 712 of high-speed memory connected directly with, in close proximity to, or integrated as part of the processor 710. The computing system 700 can copy data from the memory 715, ROM 720, RAM 725, and/or storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in the storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

The storage device 730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 730 can include the software modules 732, 734, 735 for controlling the processor 710. Other hardware or software modules are contemplated. The storage device 730 can be connected to the system bus 705. In some embodiments, a hardware module that performs a particular function can include a software component stored in a computer-readable medium in connection with the necessary hardware components, such as the processor 710, bus 705, output device 735, and so forth, to carry out the function.

FIG. 7B illustrates an example architecture for a chipset computing system 750 that can be used in accordance with an embodiment. The computing system 750 can include a processor 755, representative of any number of physically and/or logically distinct resources capable of executing software, firmware, and hardware configured to perform identified computations. The processor 755 can communicate with a chipset 750 that can control input to and output from the processor 755. In this example, the chipset 750 can output information to an output device 755, such as a display, and can read and write information to storage device 770, which can include magnetic media, solid state media, and other suitable storage media. The chipset 750 can also read data from and write data to RAM 775. A bridge 780 for interfacing with a variety of user interface components 785 can be provided for interfacing with the chipset 750. The user interface components 785 can include a keyboard, a microphone, touch detection and processing circuitry, a pointing device, such as a mouse, and so on. Inputs to the computing system 750 can come from any of a variety of sources, machine generated and/or human generated.

The chipset 750 can also interface with one or more communication interfaces 790 that can have different physical interfaces. The communication interfaces 790 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 755 analyzing data stored in the storage device 770 or the RAM 775. Further, the computing system 750 can receive inputs from a user via the user interface components 785 and execute appropriate functions, such as browsing functions by interpreting these inputs using the processor 755.

It will be appreciated that computing systems 700 and 750 can have more than one processor 710 and 755, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
   receiving an access request to access a network controller management dashboard for managing a plurality of network sites of a network;
   determining an access privilege associated with the access request;
   identifying a set of network sites for the access request based on the access privilege, wherein the set of network sites comprises a first subset of the plurality of network sites in the network that is identified from the plurality of network sites based on the access privilege;
   determining a geographical distribution of the plurality of network sites of the network and a network health factor of at least one network device at the set of network sites;
   modifying the set of network sites based on the geographical distribution of the plurality of network sites and the network health factor of the at least one network device;
   clustering the modified set of network sites into hierarchical clusters, each hierarchical cluster comprising respective network sites having a similarity associated with one or more clustering factors;

adjusting a focal point of a visual rendering of a map of the plurality of network sites to display the hierarchical clusters and exclude a second subset of the plurality of network sites; and
providing an interactive visual rendering of the hierarchical clusters based on the adjusted focal point of the visual rendering of the map of the plurality of network sites.

2. The method of claim 1, wherein the network health factor comprises at least one of a percentage of client association rejections for client devices that have attempted to associate with a network node or site, a percentage of access points down in a given site over a period of time, a number of coverage holes over a given period, a percentage of capacity reduction over a given period of time, or link failures on a given site over a period of time.

3. The method of claim 1, wherein identifying the set of network sites and modifying the set of network sites comprises:
identifying specific network sites from the plurality of network sites based on the access privilege;
determining respective health scores for at least one of the specific network sites or respective network devices at the specific network sites; and
identifying a portion of the specific network sites based on the respective health scores, the portion of the specific network sites comprising the modified set of network sites.

4. The method of claim 1, wherein the one or more clustering factors include relative geographical distances of the modified set of network sites.

5. The method of claim 1, wherein the interactive visual rendering provides a map-in-map view of the hierarchical clusters.

6. The method of claim 5, wherein a visual rendering of one of the hierarchical clusters is larger than remaining ones of the hierarchical clusters.

7. The method of claim 6, wherein each of the remaining ones of the hierarchical clusters is selectable from a smaller visual rendering within the map-in-map view.

8. A network controller comprising:
one or more memories having computer-readable instructions stored therein; and
one or more processors configured to execute the computer-readable instructions to:
receive an access request to access a network controller management dashboard for managing a plurality of network sites of a network;
determine an access privilege associated with the access request;
identify a set of network sites for the access request based on the access privilege, wherein the set of network sites comprises a first subset of the plurality of network sites in the network that is identified from the plurality of network sites based on the access privilege;
determine a geographical distribution of the plurality of network sites of the network and a network health factor of at least one network device at the set of network sites;
modify the set of network sites based on the geographical distribution of the plurality of network sites and the network health factor of the at least one network device;
cluster the modified set of network sites into hierarchical clusters, each hierarchical cluster comprising respective network sites having a similarity associated with one or more clustering factors;
adjust a focal point of a visual rendering of a map of the plurality of network sites to display the hierarchical clusters and exclude a second subset of the plurality of network sites; and
provide an interactive visual rendering of the hierarchical clusters based on the adjusted focal point of the visual rendering of the map of the plurality of network sites.

9. The network controller of claim 8, wherein the network health factor comprises at least one of a percentage of client association rejections for client devices that have attempted to associate with a network node or site, a percentage of access points down in a given site over a period of time, a number of coverage holes over a given period, a percentage of capacity reduction over a given period of time, or link failures on a given site over a period of time.

10. The network controller of claim 8, wherein identifying the set of network sites and modifying the set of network sites comprises:
identifying specific network sites from the plurality of network sites based on the access privilege;
determining respective health scores for at least one of the specific network sites or respective network devices at the specific network sites; and
identifying a portion of the specific network sites based on the respective health scores, the portion of the specific network sites comprising the modified set of network sites.

11. The network controller of claim 8, wherein the one or more clustering factors include relative geographical distances of the modified set of network sites.

12. The network controller of claim 8, wherein the interactive visual rendering provides a map-in-map view of the hierarchical clusters.

13. The network controller of claim 12, wherein a visual rendering of one of the hierarchical clusters is larger than remaining ones of the hierarchical clusters.

14. The network controller of claim 13, wherein each of the remaining ones of the hierarchical clusters is selectable from a smaller visual rendering within the map-in-map view.

15. One or more non-transitory computer-readable media comprising computer-readable instructions, which when executed by one or more processors of a network controller, cause the network controller to:
receive an access request to access a network controller management dashboard for managing a plurality of network sites of a network;
determine an access privilege associated with the access request;
identify a set of network sites for the access request based on the access privilege, wherein the set of network sites comprises a first subset of the plurality of network sites in the network that is identified from the plurality of network sites based on the access privilege;
determine a geographical distribution of the plurality of network sites of the network and a network health factor of at least one network device at the set of network sites;
modify the set of network sites based on the geographical distribution of the plurality of network sites and the network health factor of the at least one network device;
cluster the modified set of network sites into hierarchical clusters, each hierarchical cluster comprising respective network sites having a similarity associated with one or more clustering factors;

adjust a focal point of a visual rendering of a map of the plurality of network sites to display the hierarchical clusters and exclude a second subset of the plurality of network sites; and provide an interactive visual rendering of the hierarchical clusters based on the adjusted focal point of the visual rendering of the map of the plurality of network sites.

16. The one or more non-transitory computer-readable media of claim 15, wherein the network health factor comprises at least one of a percentage of client association rejections for client devices that have attempted to associate with a network node or site, a percentage of access points down in a given site over a period of time, a percentage of capacity reduction over a given period of time, or link failures on a given site over a period of time.

17. The one or more non-transitory computer-readable media of claim 15, wherein identifying the set of network sites and modifying the set of network sites comprises:

identifying specific network sites from the plurality of network sites based on the access privilege;

determining respective health scores for at least one of the specific network sites or respective network devices at the specific network sites; and identifying a portion of the specific network sites based on the respective health scores, the portion of the specific network sites comprising the modified set of network sites.

18. The one or more non-transitory computer-readable media of claim 15, wherein the one or more clustering factors include relative geographical distances of the modified set of network sites.

19. The one or more non-transitory computer-readable media of claim 15, wherein the interactive visual rendering provides a map-in-map view of the hierarchical clusters.

20. The one or more non-transitory computer-readable media of claim 19, wherein a visual rendering of one of the hierarchical clusters is larger than remaining ones of the hierarchical clusters.

* * * * *